United States Patent [19]

Tahara et al.

[11] Patent Number: 4,596,459
[45] Date of Patent: Jun. 24, 1986

[54] COLOR PRINTER SYSTEM

[75] Inventors: Syuji Tahara, Kanagawa; Takashi Yamamoto, Tokyo, both of Japan

[73] Assignee: Fuji Photo Film Co., Ltd., Kanagawa, Japan

[21] Appl. No.: 722,489

[22] Filed: Apr. 12, 1985

[30] Foreign Application Priority Data

Apr. 17, 1984 [JP] Japan .................................. 59-077290

[51] Int. Cl.$^4$ .............................................. G03B 27/80
[52] U.S. Cl. ............................................................... 355/38
[58] Field of Search ................ 355/38, 35, 88; 354/20

[56] References Cited

U.S. PATENT DOCUMENTS

| | | | |
|---|---|---|---|
| 3,672,768 | 6/1972 | Schaub et al. | 355/38 |
| 4,192,605 | 3/1980 | Fergg et al. | 355/38 |
| 4,315,686 | 2/1982 | Fergg et al. | 355/38 |
| 4,492,457 | 1/1985 | Kawada et al. | 355/38 |
| 4,518,234 | 5/1985 | Lamére | 355/38 X |

Primary Examiner—Richard A. Wintercorn
Attorney, Agent, or Firm—Sughrue, Mion, Zinn, Macpeak & Seas

[57] ABSTRACT

A color printer system has a filter driver for moving a CC filter toward and away from the exposure light path, and a negative film transmission light measuring device for detecting the source light passed through the CC filter. The system is provided with control means for controlling the movement of the CC filter by controlling the filter driver such that the CC filter is moved to the following three positions: a light source target position where the source light detected by the negative film transmission light measuring device takes a predetermined quantity and a predetermined color; a photometry target position which is obtained on the basis of the light source target position; and a light adjustment target position which is obtained on the basis of the photometry target position. Accordingly, light source management, photometry and light adjustment are automatically carried out.

20 Claims, 30 Drawing Figures

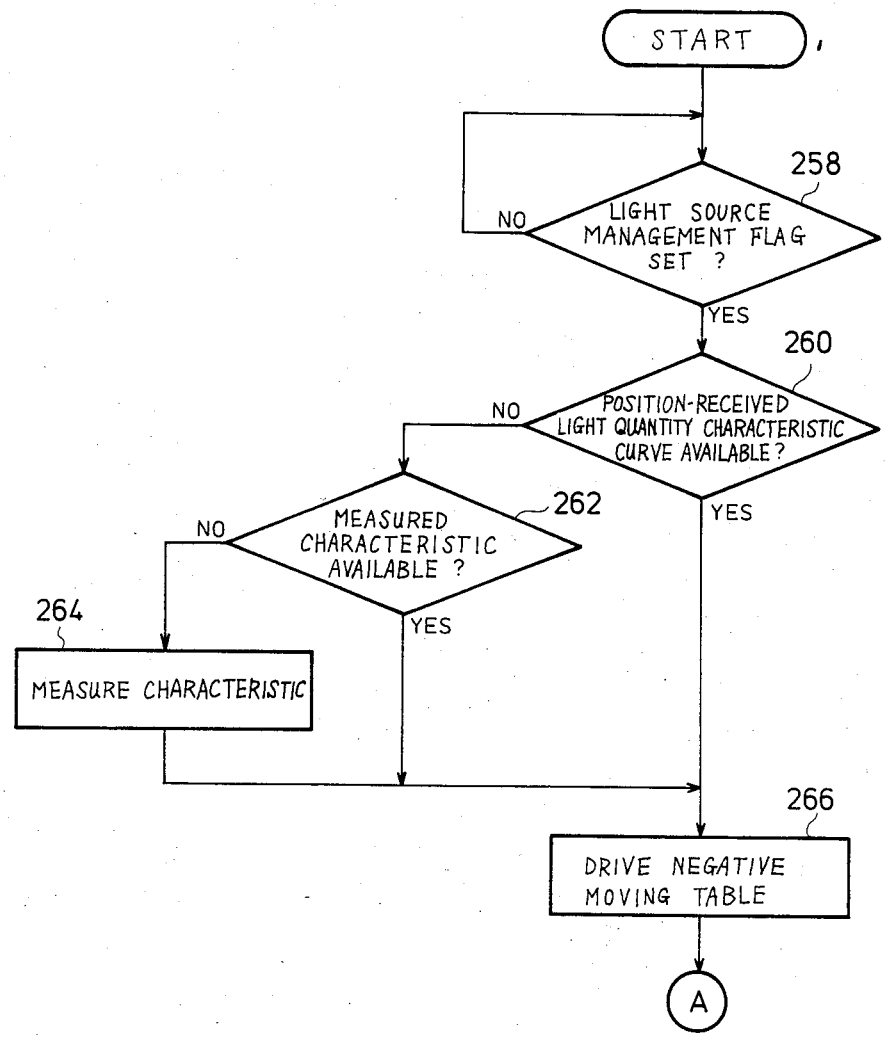

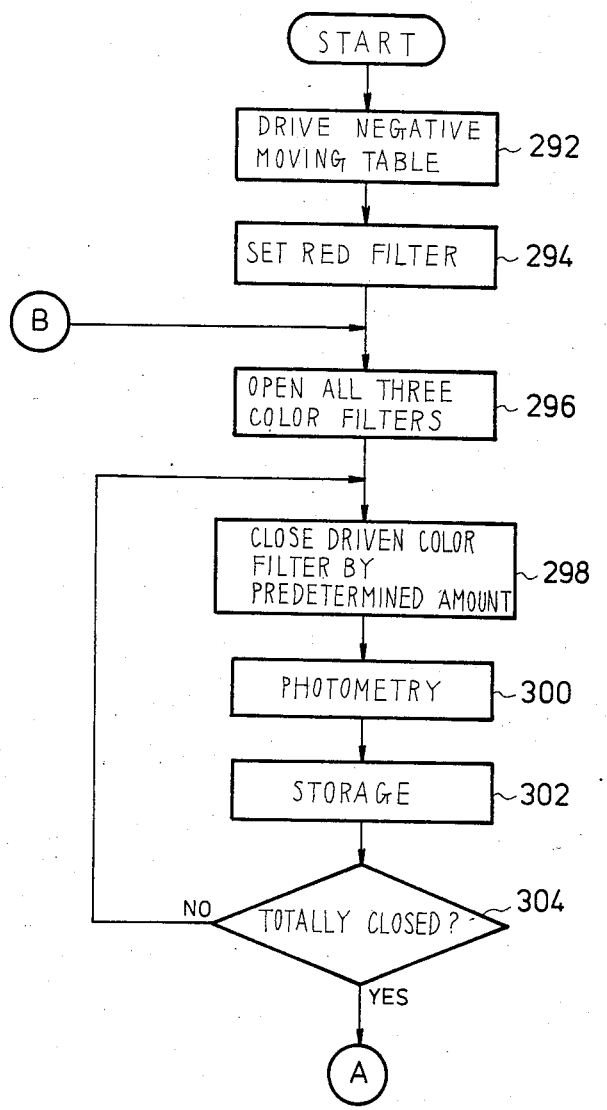

COLOR PRINTER SYSTEM

BACKGROUND OF THE INVENTION

1. Field of the Invention

The present invention relates to a color printer system having a CC filter in which each of the primary color filters are moved toward and away from the exposure light path.

2. Description of the Prior Art

In this type of printer system, the following various steps are carried out in order: light source management which is an operation of adjusting the exposure light emitted from a light source to a predetermined quantity and a predetermined color; photometry which is an operation of measuring the light emitted from the exposure light source; adjustment of the light emitted from the exposure light source; and then, exposure is effected.

To carry out these steps, that is, light source management, photometry and light adjustment, a system of the type described above is provided with a CC filter (color compensating filter) which is moved toward and away from the exposure light path, and a cut filter or a scanner photometric device. The cut filter is employed for light adjustment, and the scanner photometric device for photometry.

Since the cut filter and the scanner photometric device are high in cost, a printer system incorporating either of them disadvantageously involves an increase in the production cost.

SUMMARY OF THE INVENTION

In view of the above-described fact, a primary object of the present invention is to provide a color printer system capable of light source management, photometry and light adjustment at a reduced cost.

To this end, the present invention features an arrangement in which light source management, photometry and light adjustment are effected solely by a CC filter without employing any cut filter or scanner photometric device.

According to the invention, there is provided a color printer system comprising: a filter driver for moving a CC filter toward and away from the exposure light path; a color light receiver entered by the light emitted from an exposure lamp serving as a light source through the CC filter; and control means for controlling the movement of the CC filter by controlling the drive of the filter driver such that the CC filter is moved to the following three positions: a light source target position where the source light for exposure detected by the color light receiver takes a predetermined quantity and a predetermined color; a photometry target position which is obtained on the basis of the light source target position; and a light adjustment target position which is obtained on the basis of the photometry target position.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

One embodiment of the color printer system according to the present invention will be described hereinunder with reference to the accompanying drawings.

Figure 1:
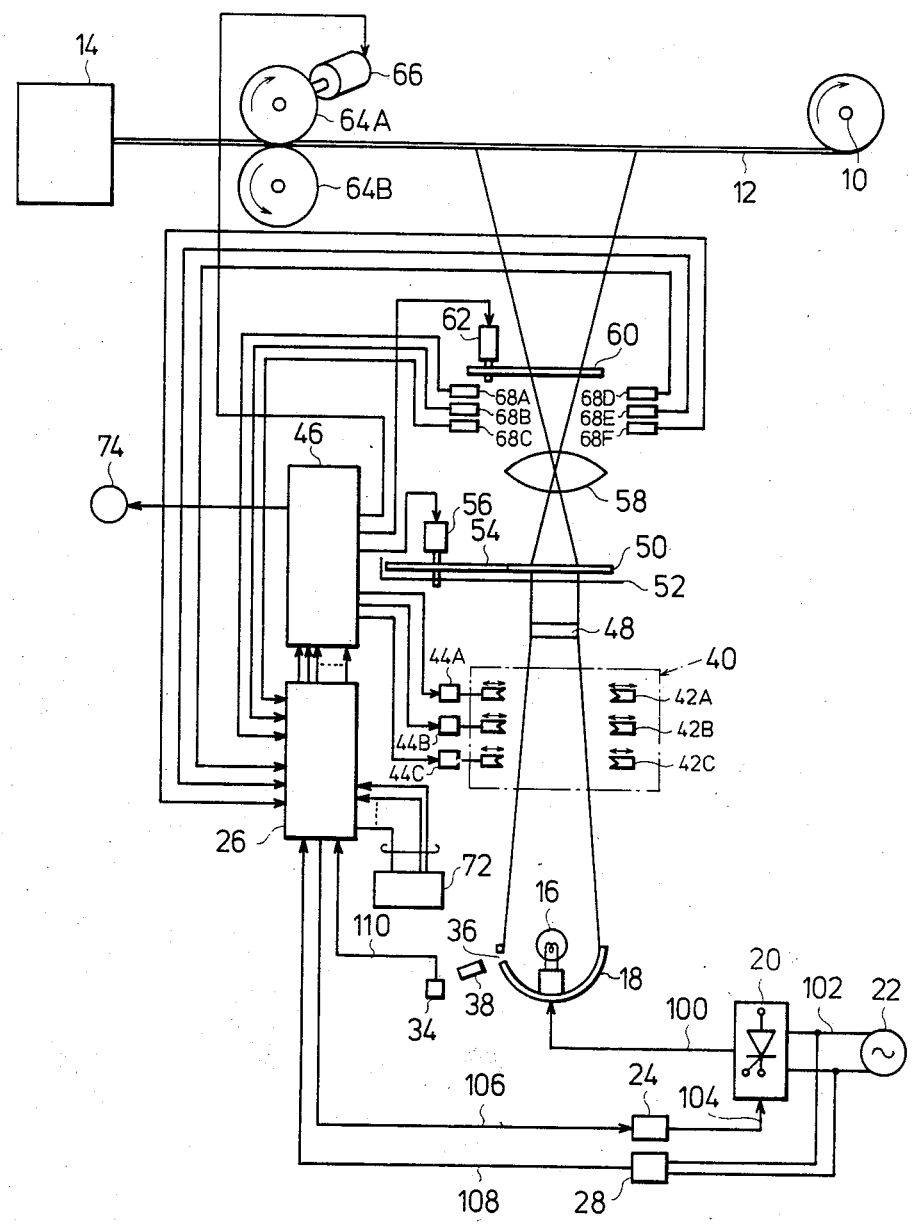
FIG. 1 shows the general arrangement of the color printer system according to the present invention.

Referring first to FIG. 1, a photographic paper 12 wound off from a paper roll shaft 10 is subjected to exposure by the color printer system. Having been subjected to exposure, the photographic paper 12 is fed to a developing machine 14 where it is developed.

The color printer system has an exposure lamp 16 for exposing the photographic paper 12. The exposure lamp 16 is mounted inside a lamp reflector 18.

The exposure lamp 16 is turned on by means of a lamp turn-on current 100 supplied from a main circuit 20 of an exposure power source. The main circuit 20 has a thyristor serving as a semiconductor current control element which converts an alternating current 102 supplied from a commercial power source 22 into the lamp turn-on current 100. It is to be noted that a large-sized power transistor may be employed in place of the thyristor.

The thyristor is supplied with a switching (commutating) signal 104 for its switching (commutating, in this case) operation from a switching signal generator circuit 24, which is in turn supplied with a switching control signal 106 from a processor circuit 26. It is to be noted that the processor circuit 26 can function as a photometric value calculating circuit for obtaining a photometric value in relation to the light from the light source.

Further, a phase detector 28 is provided for detecting the phase of the alternating current 102 for the purpose of detecting the phase of the lamp turn-on current 100. A phase detection signal 108 from the phase detector 28 is supplied to the processor circuit 26.

Figure 2:
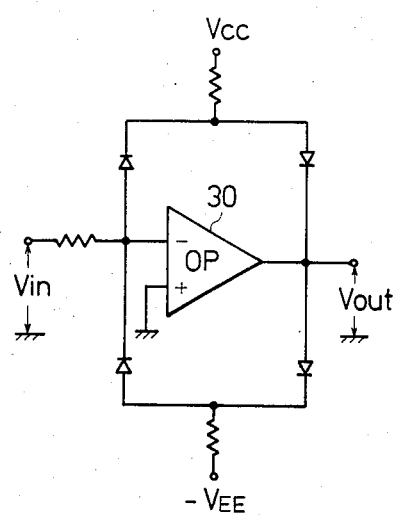
FIGS. 2 and 3 are circuit diagrams of examples of a phase detector employed in the color printer system.
Figure 3:
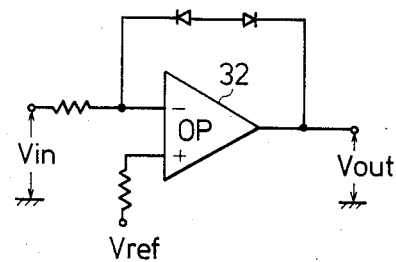

It is to be noted that this embodiment employs as the phase detector 28 a level detector constituted by an inverting operational amplifier 30 in the manner shown in FIG. 2, or a zero-crossing detector constituted by an inverting operational amplifier 32, such as that shown in FIG. 3.

Moreover, in FIG. 1 a light receiver 34 having its visual field limited to the exposure lamp 16 is provided. A light-reception signal 110 from the light receiver 34 is supplied to the processor circuit 26. The processor circuit 26 is capable of functioning also as a turn-on current control circuit which controls the turn-on current 100 in response to the light-reception signal 110.

In order to limit the visual field of the light receiver 34, the lamp reflector 18 is formed with a detection window 36. Through this detection window 36, the image of the filament of the exposure lamp 16 is formed on the light-receiving surface of the light receiver 34 by an optical system 38.

It is to be noted that the lamp reflector 18 in this embodiment is constituted by a transparent member which has a parabolic inner surface and is formed in a substantially cup-like shape, the parabolic inner surface being formed with a light-reflecting layer. The detection window 36 is formed in such a manner that a piece of tape is attached to the transparent member before the formation of the light-reflecting layer, and after it has been formed, the tape is removed, or a portion of the formed light-reflecting layer is eliminated.

As shown in FIG. 1, the quantity and color of the source light which is obtained by the exposure lamp 16 and the lamp reflector 18 are adjusted by a CC filter 40. The CC filter 40 includes component color filter pieces 42A (cyan), 42B (magenta) and 42C (yellow) which are moved toward and away from the exposure light path.

These component color filter pieces 42A, 42B and 42C are moved by a filter driver. The illustrated filter driver is constituted by step motors 44A, 44B and 44C for driving the respective component color filter pieces 42A, 42B and 42C.

These step motors 44A, 44B and 44C are respectively supplied with driving currents from a driving power source 46 and are controlled by the processor circuit 26.

Further, the source light adjusted by the CC filter 40 is applied to a negative film 50 through a mirror box 48. The negative film 50 is set on a film moving table 52.

On the film moving table 52 is also set a reference negative film 54 which can be moved onto the exposure light path in place of the negative film 50 by the movement of the film moving table 52 which is driven by a solenoid 56.

It is to be noted that the solenoid 56 is supplied with a driving current from the driving power source 46.

Further, the image on the negative film 50 is formed on the photographic paper 12 by an exposure lens 58 through a shutter 60 which is driven by a solenoid 62. It is to be noted that the solenoid 62 is supplied with a driving current from the driving power source 46.

On the other hand, the photographic paper 12 is fed, frame by frame, by means of rollers 64A and 64B. A servo motor 66 which is employed as a drive source for the rollers 64A and 64B is driven by the driving power source 46.

Figure 4:
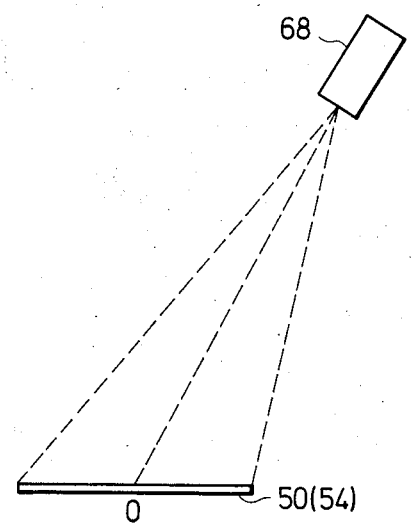
FIG. 4 shows how a light-receiving unit employed in the color printer system is provided with directivity.

In addition, the light transmitted by the negative film 50 or the reference negative film 54 is detected by light-receiving units 68A, 68B, 68C, 68D, 68E and 68F which are included in a negative film transmission light measuring device. These light-receiving units are disposed around the perpendicular passing through the center O of the negative film 50 and are directed toward the center O of the negative film 50 in the manner shown in FIG. 4.

Figure 5:
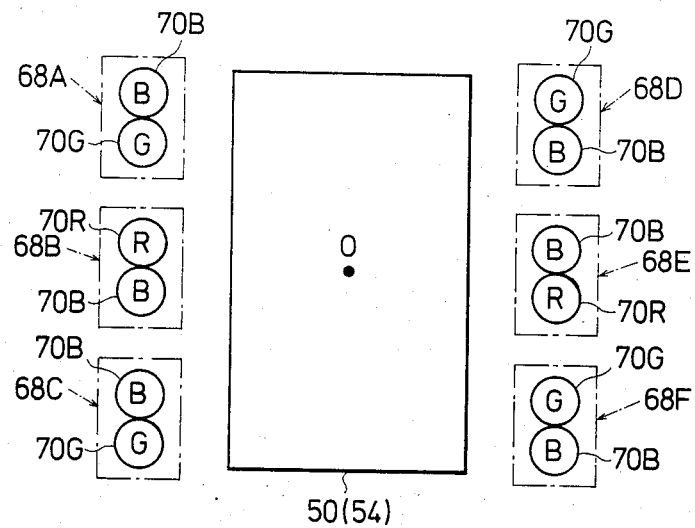
FIGS. 5 and 6 show the positional relationship between the light-receiving unit and component color light receiver.

Referring now to FIG. 5 which shows the positional relationship between the light-receiving units 68A, 68B, 68C, 68D, 68E and 68F, the light-receiving units 68A, 68B and 68C are disposed on one of the sides of the negative film 50 (or the reference negative film 54), while the light-receiving units 68D, 68E and 68F are disposed on the other side.

The light-recieving units 68A and 68F, 68B and 68E, and 68C and 68D are respectively paired and disposed in such a manner that the light-receiving units constituting each pair are in symmetry with each other with respect to the center O of the negative film 50.

Further, each of the light-receiving units 68A and 68F is constituted by a component color light receiver 70B which detects only blue and a component color light receiver 70G which detects only green; each of the light-receiving units 68B and 68E is constituted by a component color light receiver 70B and a component color light receiver 70R which detects only red; and each of the light-receiving units 68C and 68D is constituted by component color receivers 70B and 70G.

Moreover, the component color light receivers 70 of the light-receiving unit 68A and those of the light-receiving unit 68F are also disposed in symmmetry with each other with respect to the center O of the negative film 50. The same is the case with those of the pairs of light-receiving units 68B, 68E and 68C, 68D.

Figure 6:
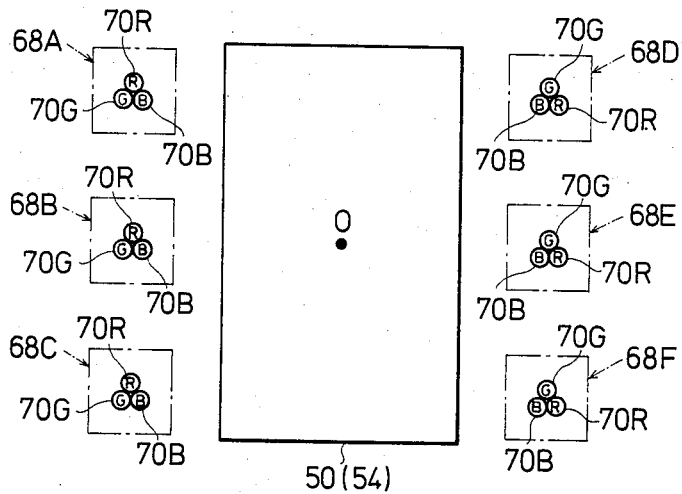

It is to be noted that the negative film transmission light measuring device may be arranged in the manner shown in FIG. 6. In this device, each of the light-receiving units 68A, 68B, 68C, 68D, 68E and 68F is constituted by component color light receivers 70R, 70G and 70B. The light-receiving units 68 which are paired are disposed symmetrically with each other with respect to the center O of the negative film 50, and the component color light receivers 70 of each pair of light-receiving units 68 are also disposed symmetrically with each other with respect to the center O of the negative film 50.

Further, each of the light receivers 70 is provided with an optical system exclusively used to form the image of the negative film on its light-receiving surface.

Moreover, in FIG. 1 a keyboard 72 is connected to the processor circuit 26, while a display 74 which is capable of functioning also as an alarm is connected to the driving power source 46.

The following is a description of the operation of the embodiment arranged as above.

First, the power source is turned on. In the case where the system has just been installed, or maintenance of the system is to be carried out, so-called setup of the system is effected thereafter.

After the power source has been turned on, the alternating current 102 from the AC power source 22 is directly supplied to the main circuit 20, without being passed through any transformer or the like.

In the case where setup of the system is not carried out, light source control, light source management, photometry, light adjustment, exposure and development management are then properly effected.

Figure 7:
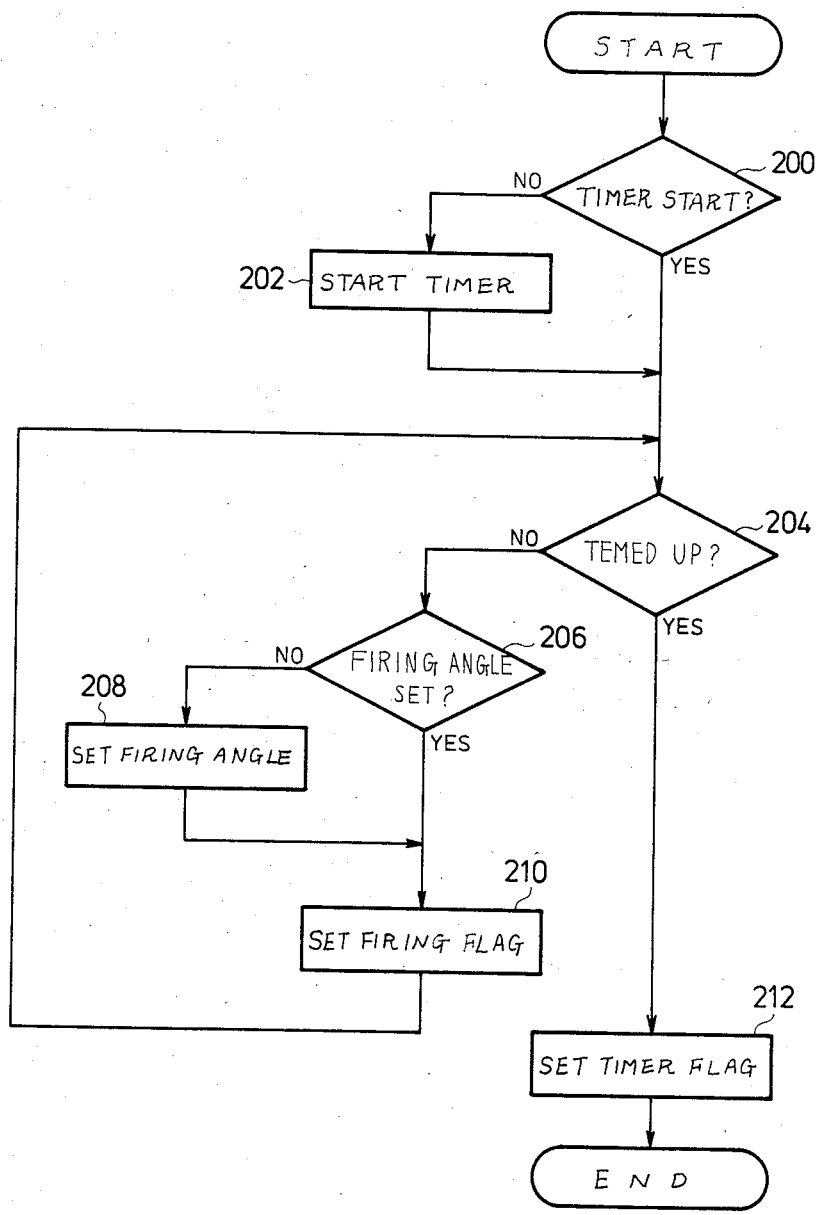
FIGS. 7, 8A&B, 9, 10, 11A&B, 12A&B, 13, 14, 15A&B, 16, 17 and 18 are flow charts which explain the operation of the color printer system shown in FIG. 1.
Figure 8A:
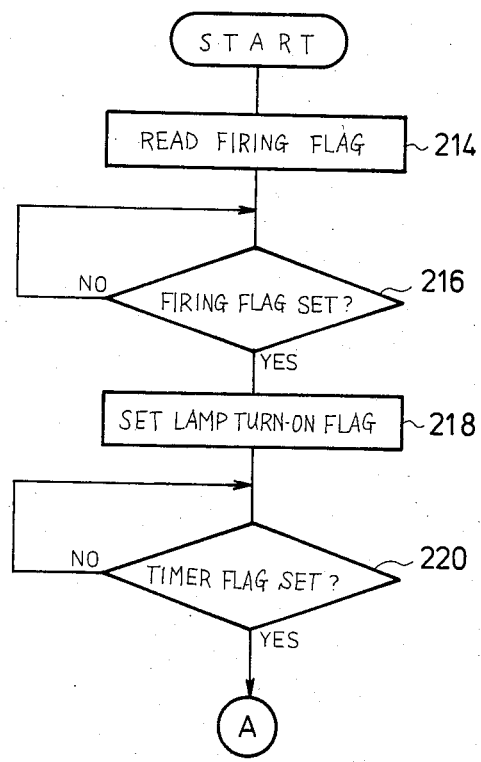
Figure 8B:
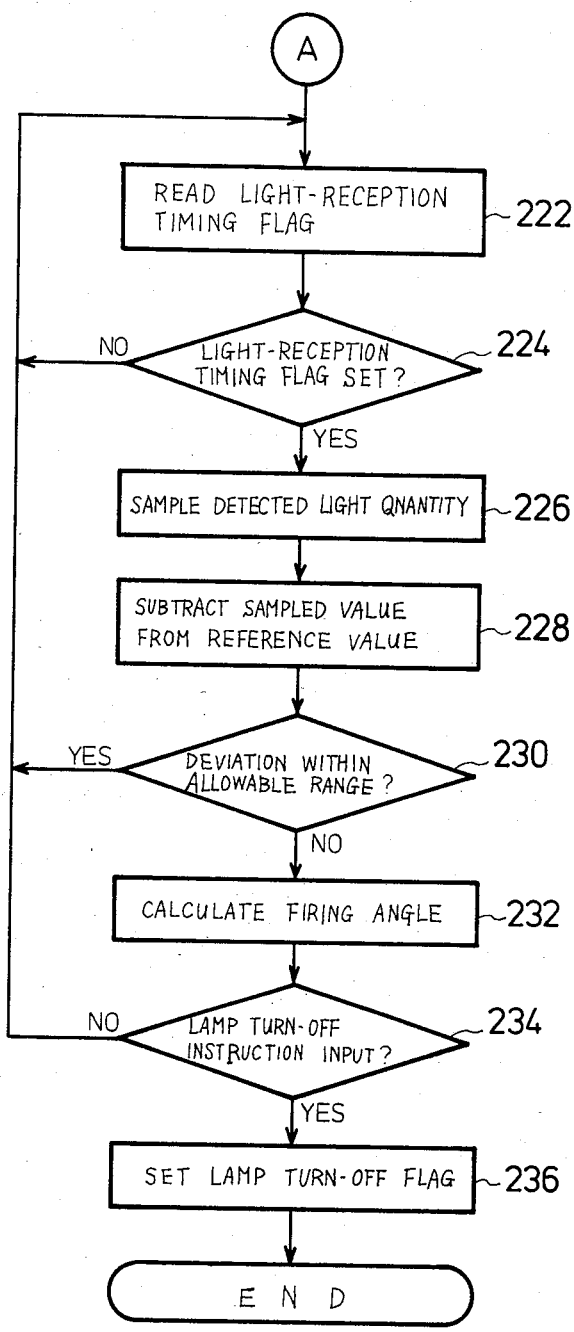
Figure 9:
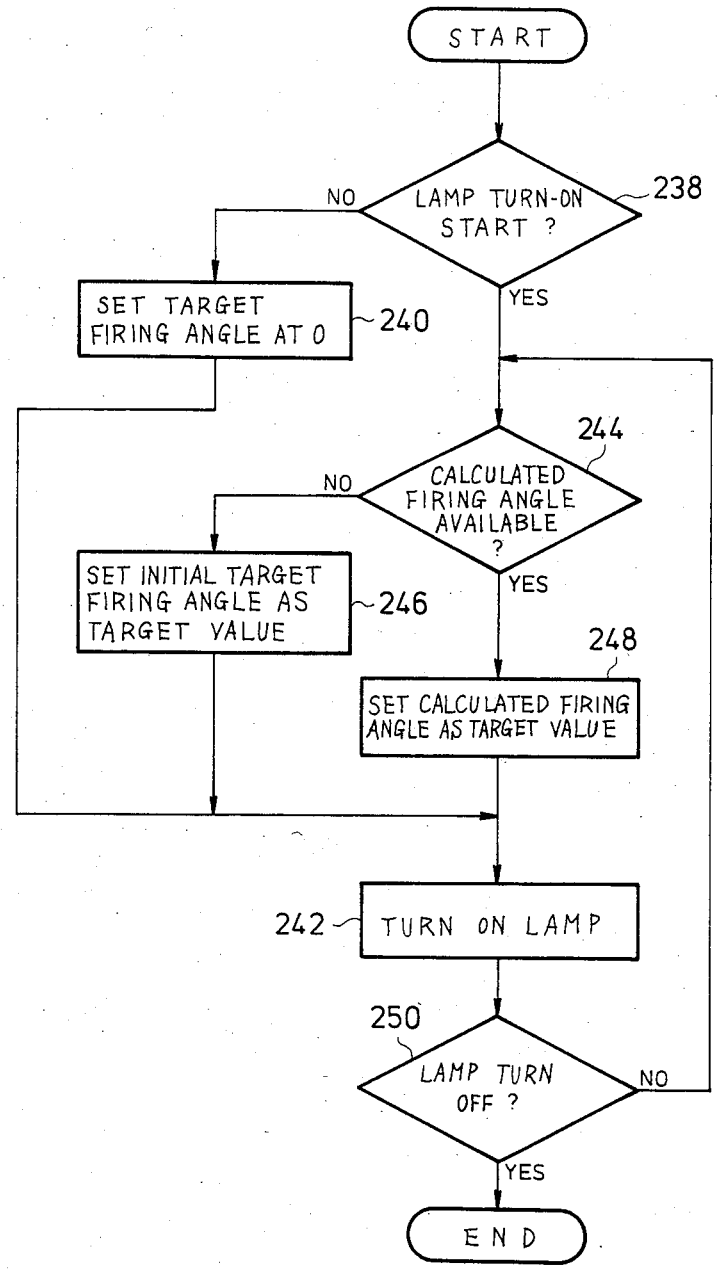
Figure 10:
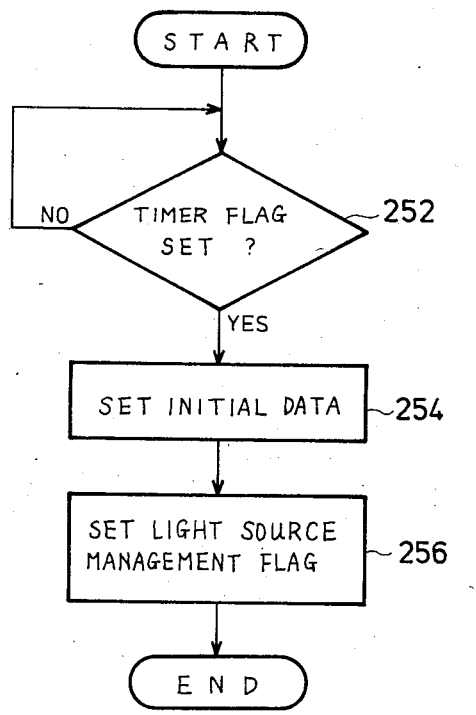
Figure 11B:
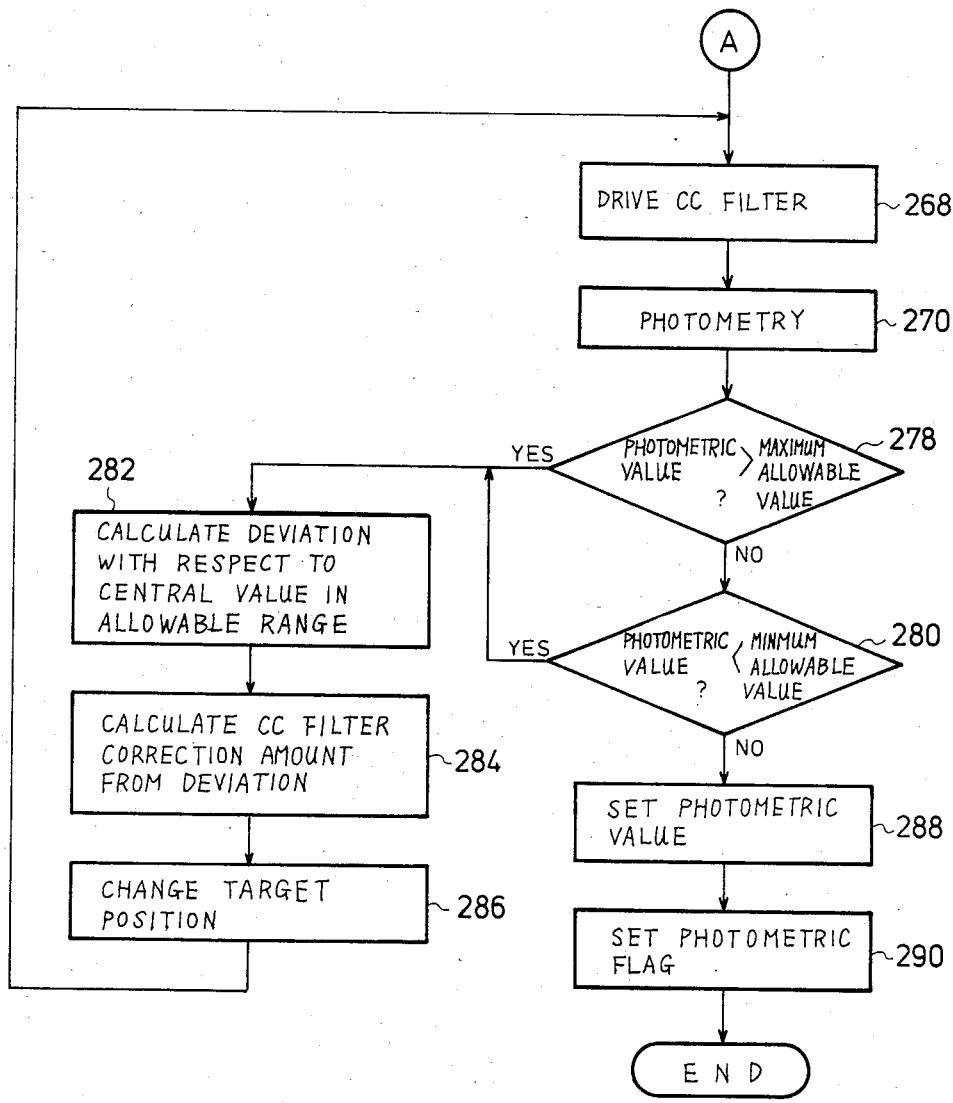
Figure 12:
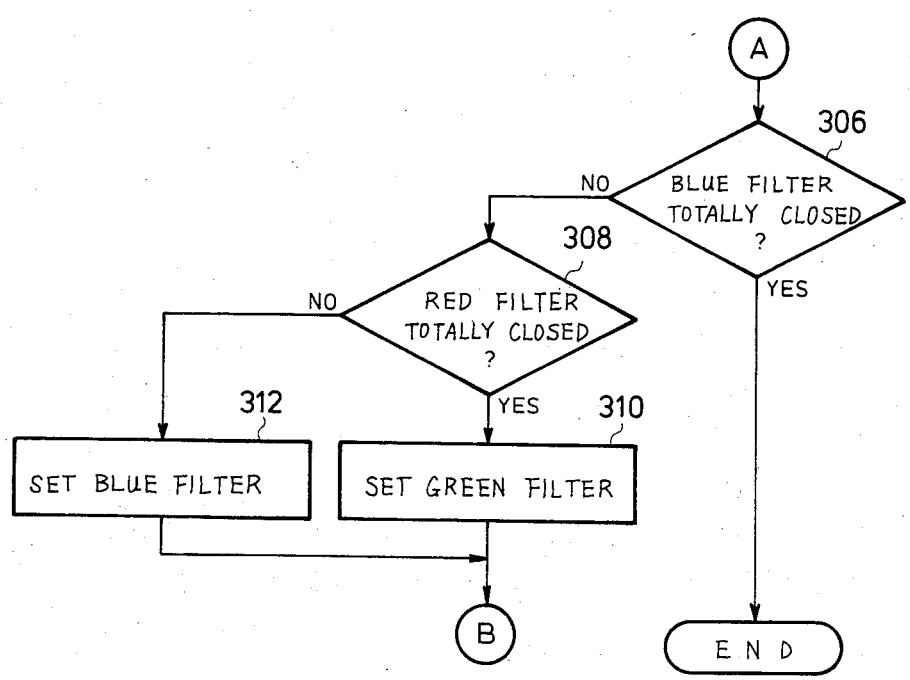
Figure 13:
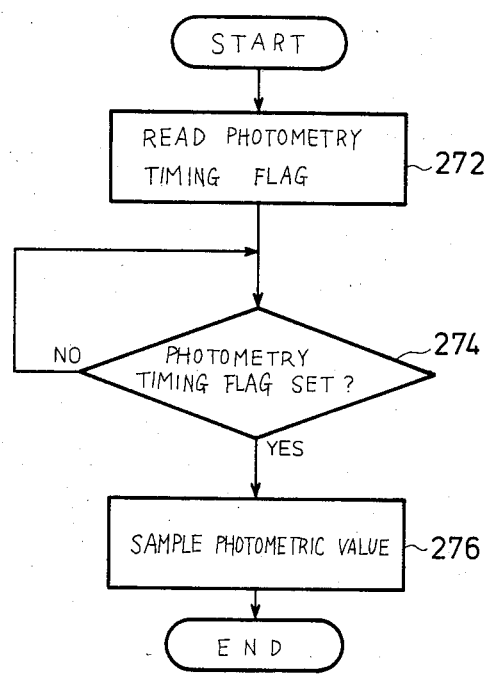
Figure 14:
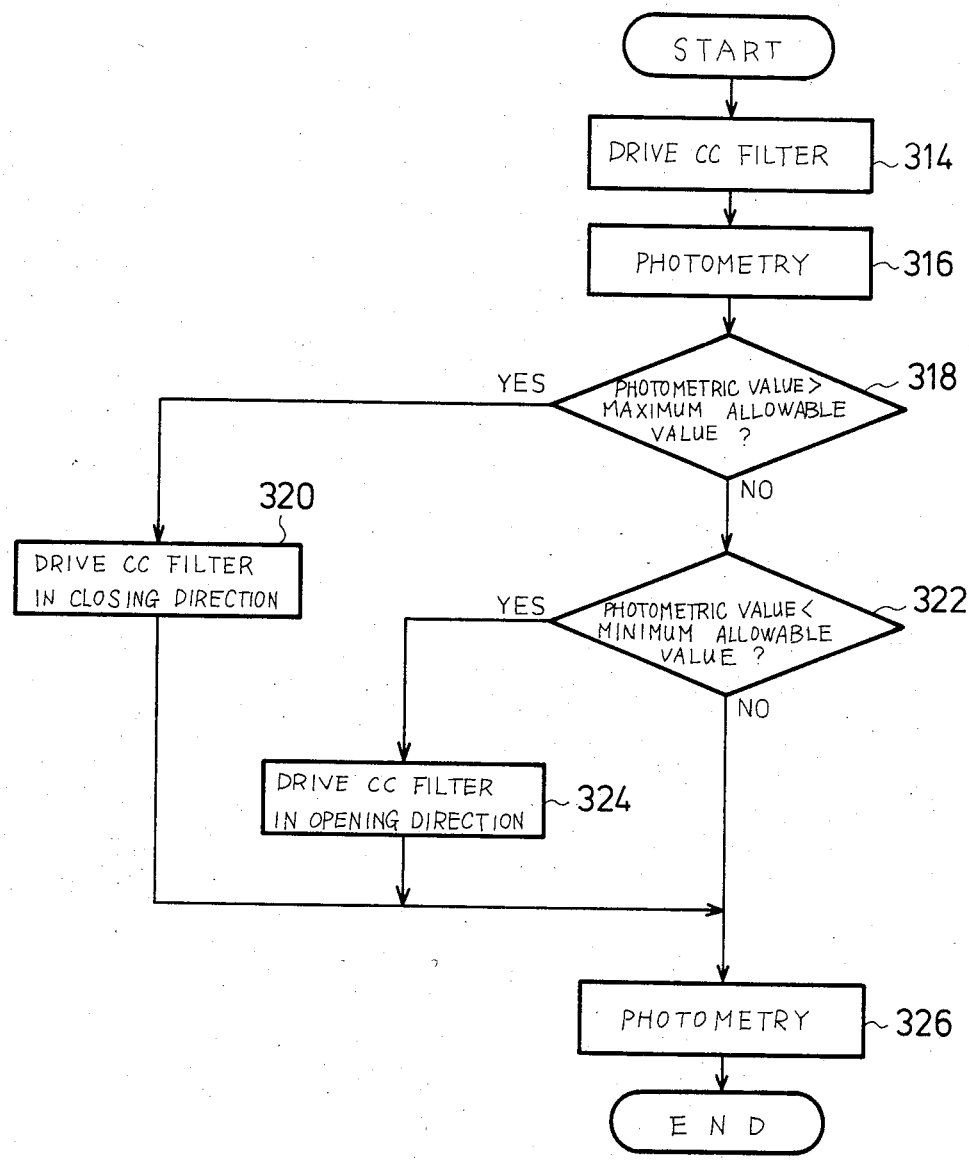
Figure 15A:
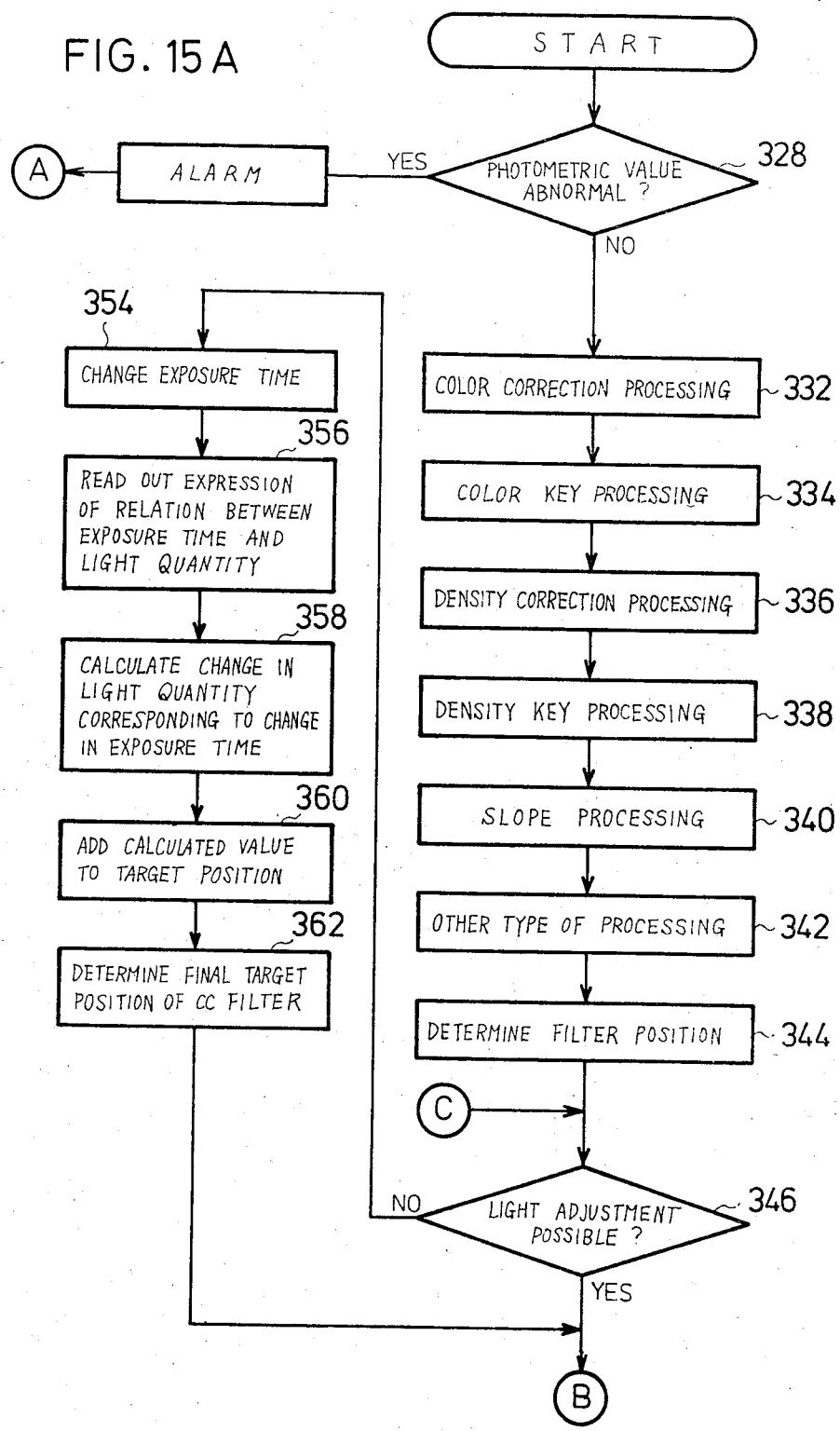
Figure 15:
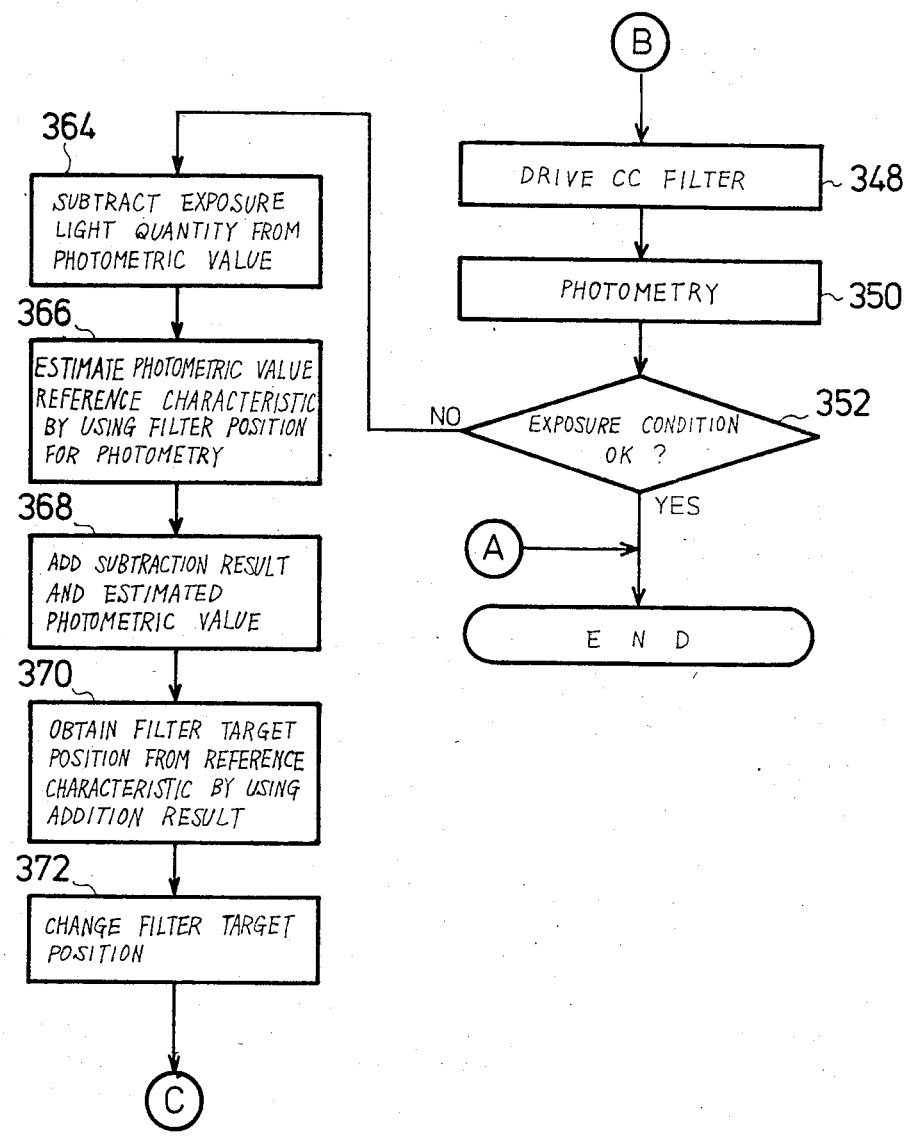
Figure 16:
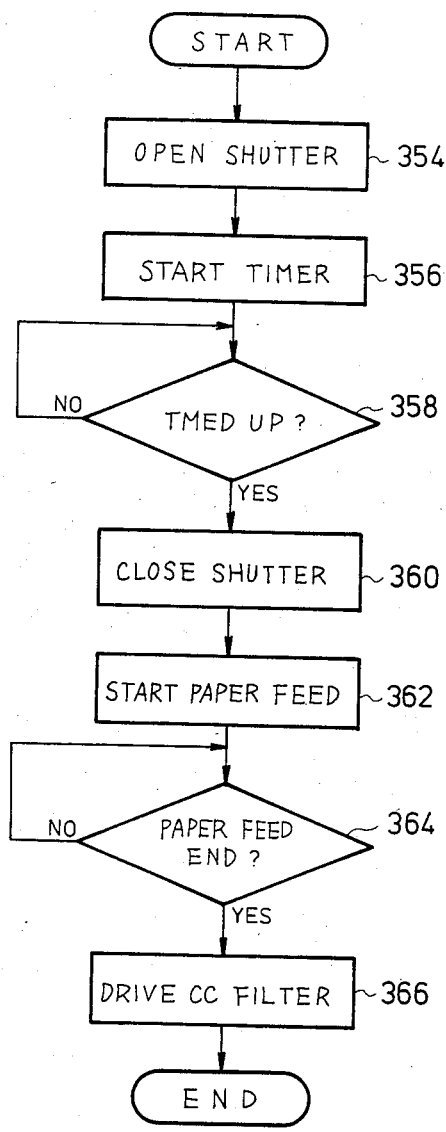
Figure 17:
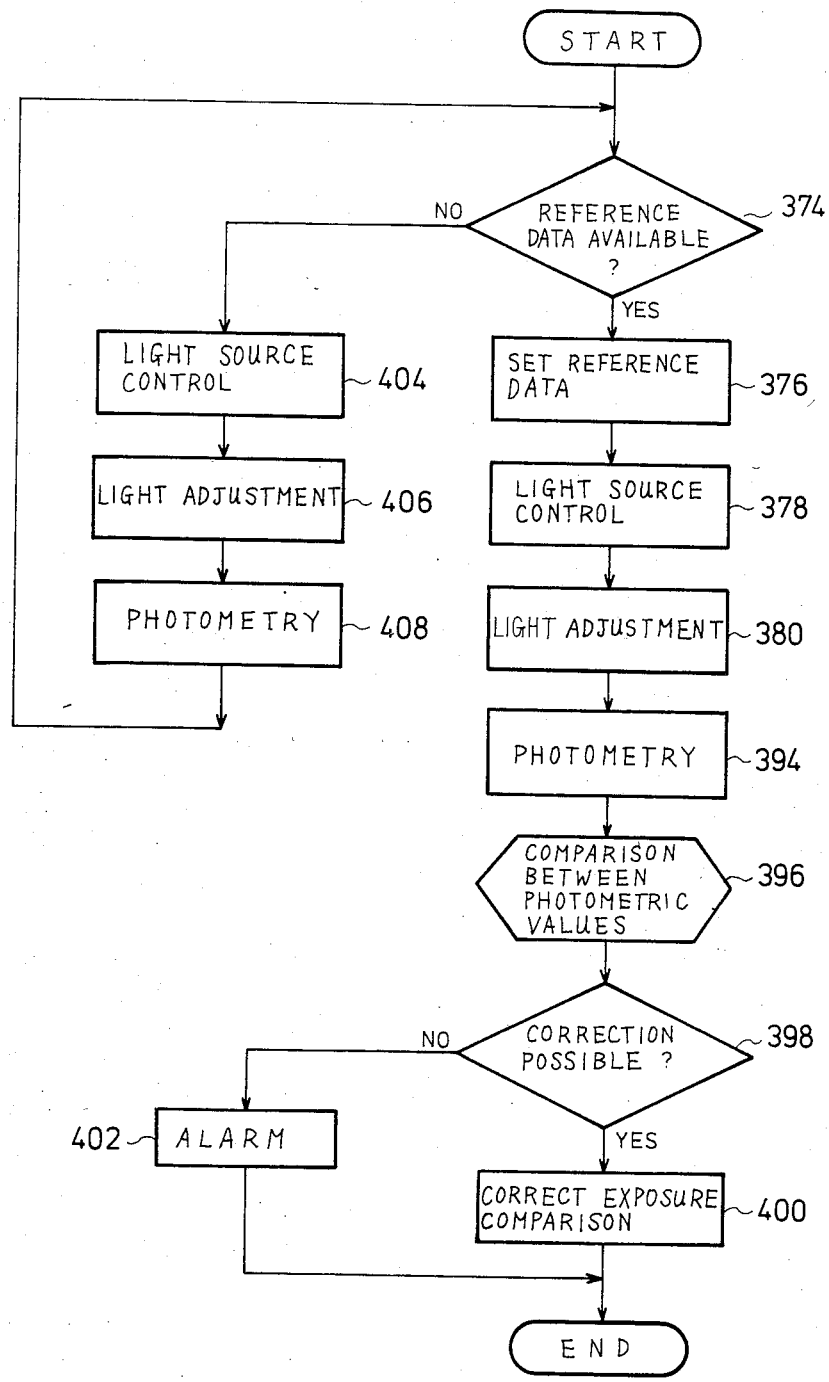
Figure 18:
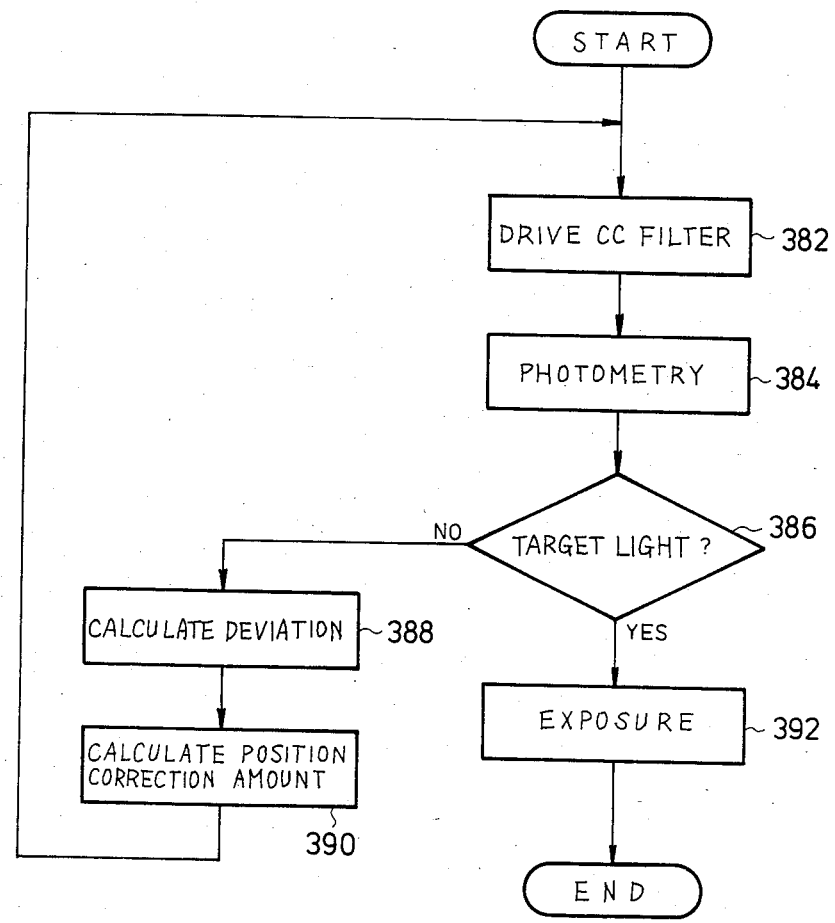

FIGS. 7, 8 and 9 show the procedure for processing light source control; FIGS. 10, 11 and 12 show the procedure for processing light source management; FIG. 13 shows the procedure for processing the light-reception signal sampling operation; FIG. 14 shows the procedure for processing photometry; FIG. 15 shows the procedure for processing light adjustment; FIG. 16 shows the procedure for processing exposure; and FIGS. 17 and 18 show the procedure for processing development management. Light source control, light source management, photometry, light adjustment, exposure and development management will be described hereinunder in the mentioned order.

As to light source control, the processing procedures shown in FIGS. 7, 8 and 9 will be first explained and the operations for light source control will then be described en bloc.

On turning on the power source, the light source starting routine shown in FIG. 7 is started, and a judgement is made in a first step 200 as to whether or not the timer has been started.

If the timer has not yet been started, the timer is started in a step 202. If the answer of the judgement made in the step 200 is affirmative, or if the timer is started in the step 202, the process then proceeds to a step 204, where a judgement is made as to whether or not the timer has timed up.

If it is judged in the step 204 that the timer has not yet timed up, a judgement is made as to whether or not an initial firing angle has been set. If any initial firing angle has not yet been set, the process proceeds to a step 208, where an initial firing angle is set.

In a step 210, a firing flag is set, and the process then returns to the step 204.

If it is judged in the step 204 that the timer has timed up, the process proceeds to a step 212, where a timer flag is set, and this routine is ended.

Referring next to FIG. 8 which shows a routine for light source control, the firing flag is read in a first step 214.

A judgement is made in a subsequent step 216 as to whether or not the firing flag has already been set. If it has, the process proceeds to a step 218, where a lamp turn-on flag is set.

Further, a judgement is made in a step 220 as to whether or not the timer flag has already been set. If it has, the process proceeds to a step 222, where a light-reception timing flag is read.

A judgement is made in a step 224 as to whether or not the light-reception timing flag has already been set. The light-reception timing flag is set and reset in synchronism with the phase detection signal 108.

If it is judged in the step 224 that the light-reception timing flag has already been set, the light-reception signal 110 detected by the light receiver 34 is sampled in a step 226.

As described above, the sampling of the light-reception signal 110 is effected in synchronism with the lamp turn-on current 110 which varies periodically, that is, in synchronism with the variation of the light source, and is therefore performed at a constant timing at all times. Thus, it is possible to accurately obtain sampled values at all times independently of the variation of the light source.

In a step 228, the sampled value is subtracted from a predetermined reference value, and a judgement is made in a step 230 as to whether or not the deviation of the sampled value from the reference value is within a predetermined allowable range.

If it is judged in the step 230 that the deviation is within the allowable range, the steps 222, 224, 226 and 228 are simply repeated. However, it it is judged in the step 230 that the deviation goes beyond the allowable range, a new target firing angle is calculated in a step 232.

In a step 234, monitoring is effected with respect to whether or not a lamp turn-off instruction has been input through the operation of the keyboard 72. If it is judged in the step 234 that the lamp turn-off instruction has not yet been input, the process returns to the step 222. However, if it is judged that the lamp turn-off instruction has already been input, the process proceeds to a step 236, where a lamp turn-off flag is set, and this routine is ended.

Referring next to FIG. 9 which shows a routine for target firing angle change processing and on/off control of the light source, monitoring is effected in a first step 238 as to whether or not a lamp turn-on start instruction has been input.

If it is judged in the step 238 that the lamp turn-on start instruction has not yet been input, the target firing angle is set at 0 in a step 240, and the exposure lamp 16 is driven such as to turn on at the set target firing angle.

Accordingly, there is no possibility in such a case of the lamp turn-on current 100 being supplied to the exposure lamp 16 from the main circuit 20. In consequence, there is no fear of the exposure lamp 16 being undesirably turned on.

On the other hand, if it is judged in the step 238 that the lamp turn-on start instruction has been input, the process proceeds to a step 244, where a judgement is made as to whether or not the firing angle calculated in the step 232 is available.

If it is judged in the step 244 that the firing angle calculated in the step 232 is not available, the process proceeds to a step 246, where the intial target firing angle is set as a target value, and the exposure lamp 16 is turned on in a step 242 with the lamp turn-on current 100 at the set firing angle.

Accordingly, the exposure lamp 16 is turned on in such a case at the initial target firing angle.

On the other hand, if it is judged in the step 244 that the firing angle calculated in the step 232 is available, this calculated firing angle is set as a target value and is learned (in a step 248), and the exposure lamp 16 is turned on at the set firing angle in the step 242.

Thereafter, monitoring is effected in a step 250 as to whether or not a lamp turn-off instruction has been input. If the lamp turn-off instruction has not yet been input, the process returns to the step 244; if the lamp turn-off instruction is input, this routine is ended.

The above-described operations in relation to light source control will be explained hereinunder en block.

First of all, the power source is turned on through the operation of the keyboard 72. At this time, if the lamp turn-on start instruction has not yet been generated, the firing angle is set at 0 (in the step 240), so that the exposure lamp 16 is placed in a turn-on preparation state.

On the other hand, at the same time as when the power source is turned on, the timer is started (in the step 202), whereby a firing angle is set (in the step 208) and the lamp turn-on start instruction is generated.

In response to the generation of the lamp turn-on start instruction, the initial target firing angle is set as a target value (in the step 246), and the exposure lamp 16 is turned on at the set firing angle (in the step 242).

Thereafter, when the turn-on state of the exposure lamp 16 becomes stable and the timer has timed up (in the step 204), the signal 110 is sampled at the timing synchronized with the power source (in the step 226). The accurately sampled value and the reference value are compared with each other (in the step 228), whereby the target firing angle is corrected in the direction in which the quantity of light emitted from the exposure lamp 16 becomes coincident with the reference value (in the steps 230, 232 and 248).

When the exposure lamp 16 is brought into a stable turn-on state in the manner described above, the quantity of light emitted from the exposure lamp 16 is monitored by the light receiver 34, and the turn-on state of the exposure lamp 16 is controlled such that the quantity of light emitted from the exposure lamp 16 becomes equal to a target value.

It is to be noted that the lamp turn-on current 100 employed in this embodiment is controlled in a ramp function manner and, therefore, the initial target firing angle is increased during the period when the exposure lamp 16 is turned on according to the function characteristic.

During the above-described light source control operation, when the fact that the exposure lamp 16 has been brought into a stable turn-on state is confirmed in a step 252 which is shown in FIG. 10 by the fact that the timer flag has been set, various kinds of initial data are set in a step 254, and a light source management flag is set in a step 256.

When this light source management flag is set, the following light source management is started, whereby the quantity of light incident on each of light-receiving units 68A, 68B, 68C, 68D, 68E and 68F is adjusted by the CC filter 40 such that the quantity of light is within the linearly operable range of each light-receiving unit independently of variations in the base density among various kinds of negative film 50, and irrespective of any adhesion of dust to the exposure lamp 16.

Accordingly, there is no possibility of the light-receiving units 68A, 68B, 68C, 68D, 68E and 68F being saturated by an excessively large quantity of incident light, and there is no fear of the signal-to-noise ratio thereof being lowered. Thus, an excellent detecting operation of the light-receiving units 68A, 68B, 68C, 68D, 68E and 68F is ensured.

For this reason, this light source management is carried out every time channel data is set, for example, every time the negative film 50 is replaced with another, rather than every time a single frame is exposed.

The above-described light source management is effected by the CC filter 40 which is driven in the following manner.

The operations in relation to the CC filter 40 will be collectively described after the completion of the explanation of the procedures respectively shown in FIGS. 11 and 12.

Figure 19:
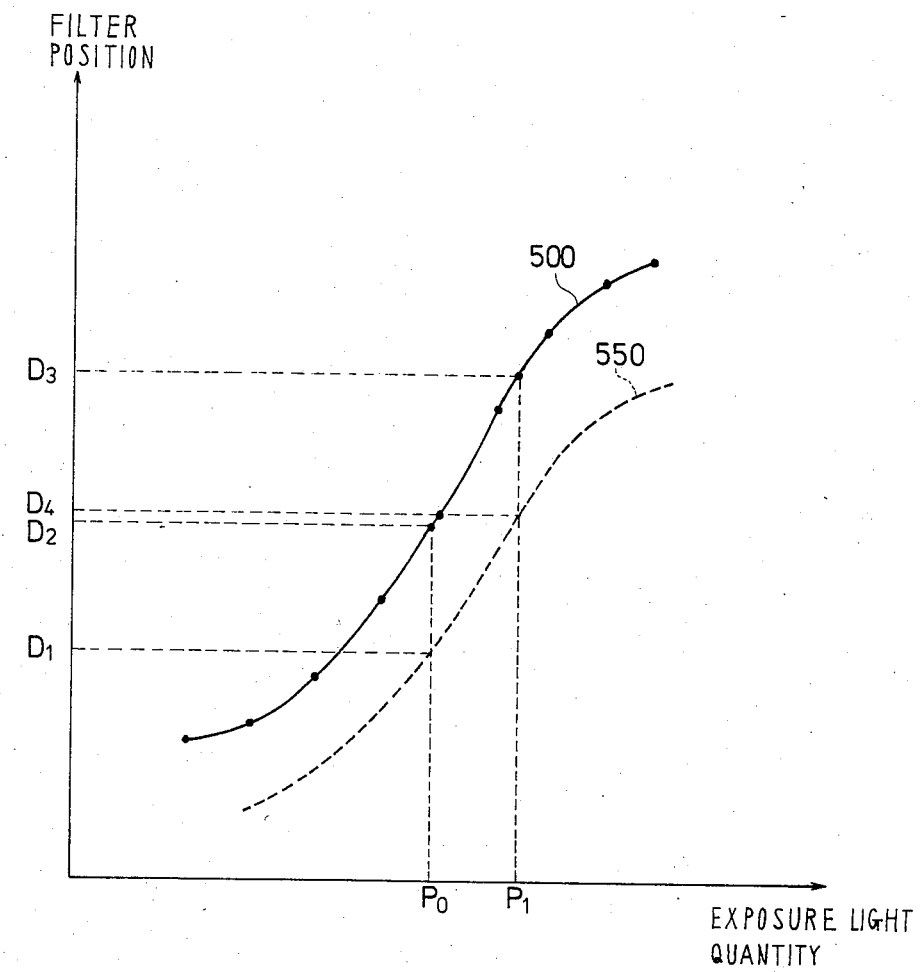
FIG. 19 is a graph showing reference characteristics.

Referring first to FIG. 11, when the fact that the light source management flag has been set is confirmed in a step 258, the process proceeds to a step 260, where a judgement is made as to whether or not a reference characteristic curve has previously been provided, such as that shown by a characteristic curve 500 in FIG. 19 which shows the relationship between the respective positions of the component color filter pieces 42A, 42B and 42C and the quantities of light respectively received by the light-receiving units 68A, 68B, 68C, 68D, 68E and 68F.

This reference characteristics curve is employed for the purpose of adjusting the source light obtained from the exposure lamp 16 in such a manner that a predetermined color and a predetermined quantity of light are obtained. The component color filter pieces 42A, 42B and 42C are driven to move to their respective positions as defined by the reference characteristic curve in accordance with the signals respectively detected by the light-receiving units 68A, 68B, 68C, 68D, 68E and 68F in the manner described hereinunder, whereby the source light obtained from the exposure lamp 16 is adjusted to a predetermined color and a predetermined quantity within the above-described linearly operable range.

Thus, the reference characteristic curve is required for the light source management and, therefore, if it is judged in the step 260 that no reference characteristic curve is available, a judgement is made in a step 262 as to whether or not any reference characteristic curve which has previously been measured is available.

If it is judged in the step 262 that a reference characteristic curve which has previously been measured is available, this reference characteristic curve is employed; if it is judged that no previously measured reference characteristic curve is available, a reference characteristic curve is measured in a step 264.

When a previously prepared or newly measured reference characteristic curve is thus obtained, the film moving table 52 is driven by the solenoid 56 in a step 266, whereby the reference negative film 54 is set on the exposure light path.

In a subsequent step 268, the component color filter pieces 42A, 42B and 42C are respectively moved to their predetermined target positions. In a step 270, light-reception signals respectively detected by the light-receiving units 68A, 68B, 68C, 68D, 68E and 68F are sampled, whereby photometry is carried out.

This photometry is conducted according to a routine shown in FIG. 13. In the Figure, a photometry timing flag is read in a first step 272. Then, a judgement is made in a step 274 as to whether or not the photometry timing flag has already been set. When the photometry timing flag has already been set, light-reception signals which are respectively detected by the light-receiving units 68A, 68B, 68C, 68D, 68E and 68F are sampled in a step 276, whereby a photometric value is obtained.

In this case, the photometry timing flag is set and reset in synchronism with the phase detection signal 108 in a manner similar to the above-described light-reception timing flag. It is, therefore, possible to obtain accurately sampled values at all times independently of a light source which periodically varies.

After the photometry has been effected in the step 270 in the above-described manner, a judgement is made in steps 278 and 280 shown in FIG. 11 as to whether or not the obtained photmetric value is within a predetermined allowable range.

When it is judged in these steps 278 and 280 that the obtained photometric value is out of the allowable range, the process proceeds to a step 282, where the deviation of the photometric value from the central value in the allowable range is calculated.

In a step 284, a correction movement of each of the component color filter pieces 42A, 42B and 42C is calculated from the obtained deviation. Then, the target position of the CC filter 40 is changed in a step 286 in accordance with the calculated correction movement, and the changed target position is learnt.

When the processing in this step 286 has been completed, the process returns to the step 268, and when it is judged in the steps 278 and 280 that the obtained photometric value is within the allowable range, the photometric value at that time is set in a step 288, and a reference characteristic curve is learnt which has been moved parallel as far as a characteristic curve which includes that photometric value and the target position. Consequently, this reference characteristic curve which has been moved parallel is employed thereafter.

Then, the light source flag is reset and the photometry flag is set in a step 290, and the routine shown in FIG. 11 is ended.

The following is a description of the procedure of the characteristic measuring processing carried out in the step 264 with reference to FIG. 12.

In a first step 292, the film moving table 52 is driven such that the reference negative film 54 is set on the exposure light path. Then, the component color filter piece 42A is set as a component color filter piece 42 which is to be driven first (in a step 294).

It is to be noted that the step 294 may be carried out in a state wherein the reference negative film 54 is removed from the exposure light path.

Then, all the component color filter pieces 42A, 42B and 42C are totally opened in a step 296, and the component color filter piece 42A alone is closed by a predetermined degree in a step 298.

In a step 300, photometry is effected according to the procedure shown in FIG. 13, and the photometric value obtained is stored in a step 302.

Further, a judgement is made in a step 304 as to whether or not the component color filter piece 42 being driven is totally closed. If it is judged that the component color filter piece 42 is not totally closed, the process returns to the step 298, and the drive and photometry in relation to the component color filter piece 42 and the storage of the obtained photometric value are repeated until the component color filter piece 42 is totally closed.

On the other hand, when it is judged in the step 304 that the component color filter piece 42 being driven is totally closed, the process proceeds to a step 306, wherein a judgement is made as to whether or not the component color filter piece 42C is closed.

If the component color filter piece 42A is first driven toward the filter closing direction, the component color filter piece 42C is opened in the step 296. In consequence, the answer of the judgement made in the step 306 is negative, and the process proceeds to a step 308.

A judgement is made in the step 308 as to whether or not the component color filter piece 42A is closed. If the component color filter piece 42A is first driven in the filter closing direction, it is closed at this time. Therefore, the answer of the judgement made in the step 308 is affirmative. Then, in a step 310, the component color filter piece 42B is set as a component color filter piece 42 which is to be subsequently driven, and the process then returns to the step 296.

As a result, the component color filter piece 42B is driven from its totally open position to its totally closed position. During this driving operation, photometry is carried out, and the photometric values obtained are successively stored.

Thereafter, when the component color filter piece 42B is totally closed, the answer of the judgement made in the step 308 becomes nagative (only the component color filter piece 42B is closed at this time), and the process proceeds to a step 312.

In the step 312, the component color filter piece 42C is set as a component color filter piece 42 which is to be finally driven. Then, the process returns to the step 296, and similar processing is repeated thereafter.

As a result, the component color filter piece 42C is driven from its totally open position to its totally closed position. In the meantime, photometry is carried out, and the photometric values obtained are successively stored.

When the component color filter piece 42C is totally closed, and the answer of the judgement made in the step 306 becomes affirmative, this routine is ended.

Thus, the relationship between various positions and corresponding photometric values for each of the component color filter pieces 42A, 42B and 42C is stored, and the above-described reference characteristic curve which represents the relationship between the position and the quantity of light received is formed on the basis of the thus obtained and stored relationship for each of the component color filter pieces 42A, 42B and 42C.

By virtue of the processing in each of the steps 318, 320, 322 and 324, the CC filter 40 is controlled such as to move to a position where each of the light-receiving units 68 is within a region where the unit 68 is linearly operable. Accordingly, there is no possibility of each light-receiving unit 68 being saturated by an input of an excessively large quantity of light, and there is no fear of its signal-to-noise ratio being lowered.

As described above, in this color printer system, the light source management is carried out by the use of the CC filter 40.

To sum up, the above-described operations are as follows. First, the reference characteristic curve is prepared in relation to the negative film 50 to be set.

Then, the CC filter 40 is moved to a position where an optimum source light is obtained. A judgement is made as to whether or not the source light obtained at this time is optimum.

If it is judged that the source light is not optimum owing to the adhesion of dust to the exposure lamp 16 or the deterioration in performance of the lamp 16, an optimum position of the CC filter 40 is obtained and learned, and the CC filter 40 is moved to the thus obtained optimum position.

Thus, this color printer system automatically provides self-management of the light source in such a manner that it is possible to obtain an optimum source light at all times independently of, for example, the kinds of negative film.

The photometry will now be explained. It is to be noted that the photometry in this case is carried out frame by frame because the optical properties of the negative film 50 may be changed by, for example, the heat from the light source.

In a first step 314 in FIG. 14, each of the component color filter pieces 42A, 42B and 42C, constituting the CC filter 40, is driven to move to a specified target position. In a step 316, photometry is carried out according to the procedure shown in FIG. 13. It is to be noted that the negative film 52 has already been set on the exposure light path by this time.

A judgement is made in a step 318 as to whether or not the obtained photometric value is larger than the maximum value in the allowable range. If it is judged that the photometric value is larger than the maximum value in the allowable range, the component color filter pieces 42A, 42B and 42C are driven in a step 320 in a direction in which they are closed.

On the other hand, if it is judged in the step 318 that the photometric value is not larger than the maximum value in the allowable range, the process proceeds to a step 322, where a judgement is made as to whether or not the photometric value is smaller than the minimum value in the allowable range.

If it is judged in the step 322 that the photometric value is smaller than the minimum value in the allowable range, the process proceeds to a step 324, where the component color filter pieces 42A, 42B and 42C are driven in the direction in which they are opened.

When the processing in either of the steps 320 or 324 has been completed, or when the answer of the judgement made in the step 322 becomes negative, that is, when it is judged that the photometric value is within the allowable range, the process proceeds to a step 326, where photometry is carried out again according to the procedure shown in FIG. 13, and this routine is ended.

As described above, the CC filter 40 is also utilized for this photometry. In this case, the photometric operation is conducted in such a manner that each of the component color filter pieces 42A, 42B and 42C is controlled such as to move to a predetermined target position (which has previously been stored in the memory, or instructed).

The following is a description of the light adjustment which is to be conducted subsequently to the above-described photometry.

The light adjustment is an operation of adjusting the quantity of source light employed for exposure by obtaining a target position of the CC filter 40 on the basis of predetermined exposure conditions and the measured value obtained by the above-described photometry, and effecting control such that the CC filter 40 is moved to the obtained target position.

In this color printer system, the light adjustment is conducted as follows:

Referring now to FIG. 15 which shows the procedure for processing the light adjustment, a judgement is made in a first step 328 as to whether or not the phtometric value obtained by the processing in the step 326 is abnormal.

If it is judged in the step 328 that the photometric value is abnormal, the process proceeds to a step 330, where the fact that the photometric value is abnormal is displayed on the display 74, and this routine is ended.

It is to be noted that possible causes of an abnormal photometric value include a failure in the light receiver and the disconnection of the exposure lamp 16.

On the other hand, if it is judged in the step 328 that the photometric value is not abnormal, various kinds of exposure calculation processing, which include color correction processing, color key processing, density correction processing, density key processing, slope processing and other kinds of processing, are respectively executed in steps 332, 334, 336, 338, 340 and 342. On the basis of an exposure light quantity obtained by such processing and a predetermined exposure time, respective target positions of the component color filter pieces 42A, 42B and 42C, that is, a proper quantity and a proper color of source light for exposure, are determined in a step 344.

According to this embodiment, standard data (e.g., RGB balance) required for at least the color correction processing (in the step 332) and the density correction processing (in the step 336) have previously been given as fixed data, and in the color correction processing (in the step 332), the color key processing (in the step 334), the density correction processing (in the step 336) and the density key processing (in the step 338), the various kinds of exposure calculation processing are executed according to data previously instructed through the keyboard 72 for each frame.

Figure 20:
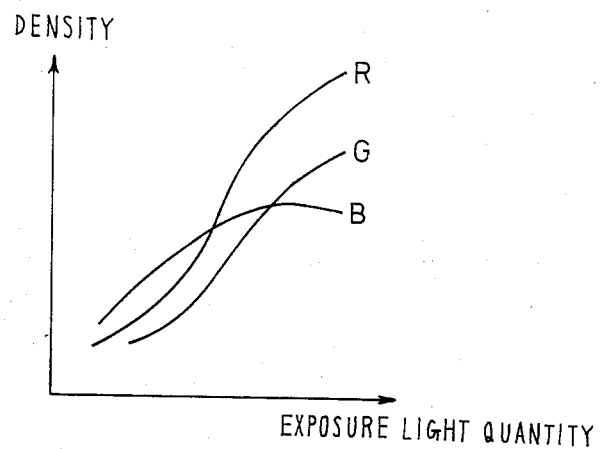
FIG. 20 is a graph showing the photosensitive characteristics of a negative film.

The negative film 50 has photosensitive characteristics such as those shown in FIG. 20. The photosensitive characteristics differ depending upon the kind of negative film 50 employed. The slope processing (in the step 340) is carried out for the purpose of obtaining an optimum source light for exposure in accordance with the photosensitive characteristics of the negative film 50 to be subjected to printing.

Accordingly, the slope processing is executed every time a different kind of negative film 50 is set.

Figure 21:
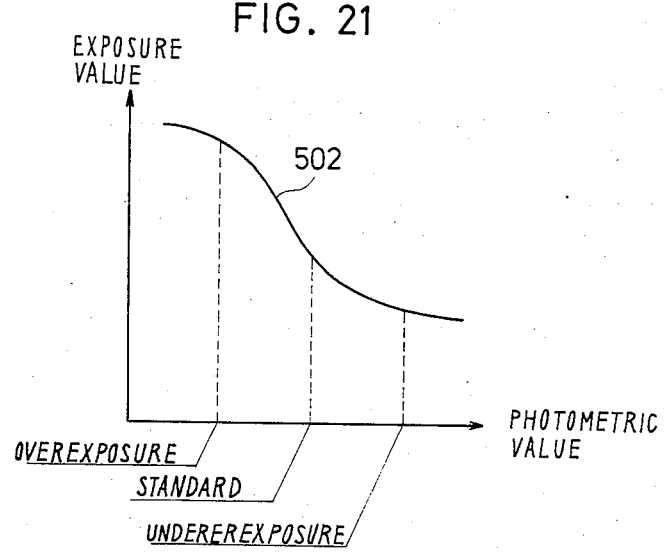
FIG. 21 is a graph showing slope characteristics.
Figure 22:
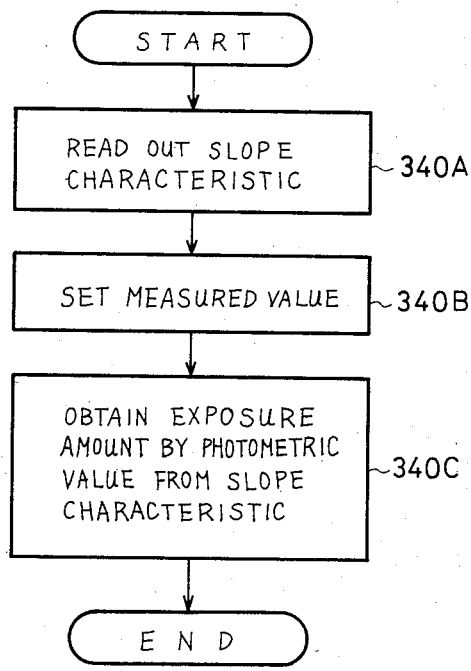
FIG. 22 is a flow chart explaining the slope processing.

In order to execute the slope processing, in this color printer system, a slope characteristic curve 502, such as that shown in FIG. 21, has previously been given as fixed data and is read out in a first step 340A in FIG. 22.

In a step 340B, a photometric value is set, and an exposure light quantity is obtained in a step 340C from the slope characteristic curve 502 in correspondence with the set photometric value.

Further, a target position of the CC filter 40 is calculated in the step 344 on the basis of the obtained exposure light quantity and the above-described exposure time.

It is to be noted that, according to this embodiment, a plurality of photometric values and a plurality of exposure light quantities have previously been stored as fixed data on a table at predetermined distances in such a manner as to correspond to each other. When a measured value does not coincide with any photometric value on the table, interpolation is carried out and an exposure light quantity is thereby obtained.

A judgement is made in a subsequent step 346 as to whether or not it is possible for each of the component color filter pieces 42A, 42B and 42C to move to the position obtained as described above.

If it is judged in the step 346 that it is possible for each of the component color filter pieces 42A, 42B and 42C to move to that position, the process proceeds to a step 348, where each of the component color filter pieces 42A, 42B and 42C is actually driven such as to move to its target position.

In a step 350, photometry is then carried out by the light-receiving units 68A, 68B, 68C, 68D, 68E and 68F according to the procedure shown in FIG. 13.

When it is confirmed in a step 352 that the exposure conditions are satisfied by the photometric values obtained in the step 350, this routine is ended.

On the other hand, if it is judged in the step 346 that any one of the component color filter pieces 42A, 42B and 42C cannot move to its target position, the following exposure content change processing is executed.

If it is judged in the step 346 that it is not possible for any one of the component color filter pieces 42A, 42B and 42C to move to its target position, the process proceeds to a step 354, where a predetermined exposure time is stepwisely changed.

Then, an expression of the relation between the exposure time and the exposure light quantity is read out in a step 356.

Further, the amount by which the exposure light quantity is to be changed is calculated in a step 358 on the basis of the expression of the relation by the use of the exposure time which was changed in the step 354.

In a step 360, a positional correction amount which corresponds to the change in the exposure light quantity obtained in the step 358 is added to the filter position which has once been determined in the step 344.

The position obtained in the step 360 is determined as a final target position in a step 362, and the process returns to the step 348.

The respective processing operations in the steps 346, 354, 356, 358, 360 and 362 are as follows.

Figure 23:
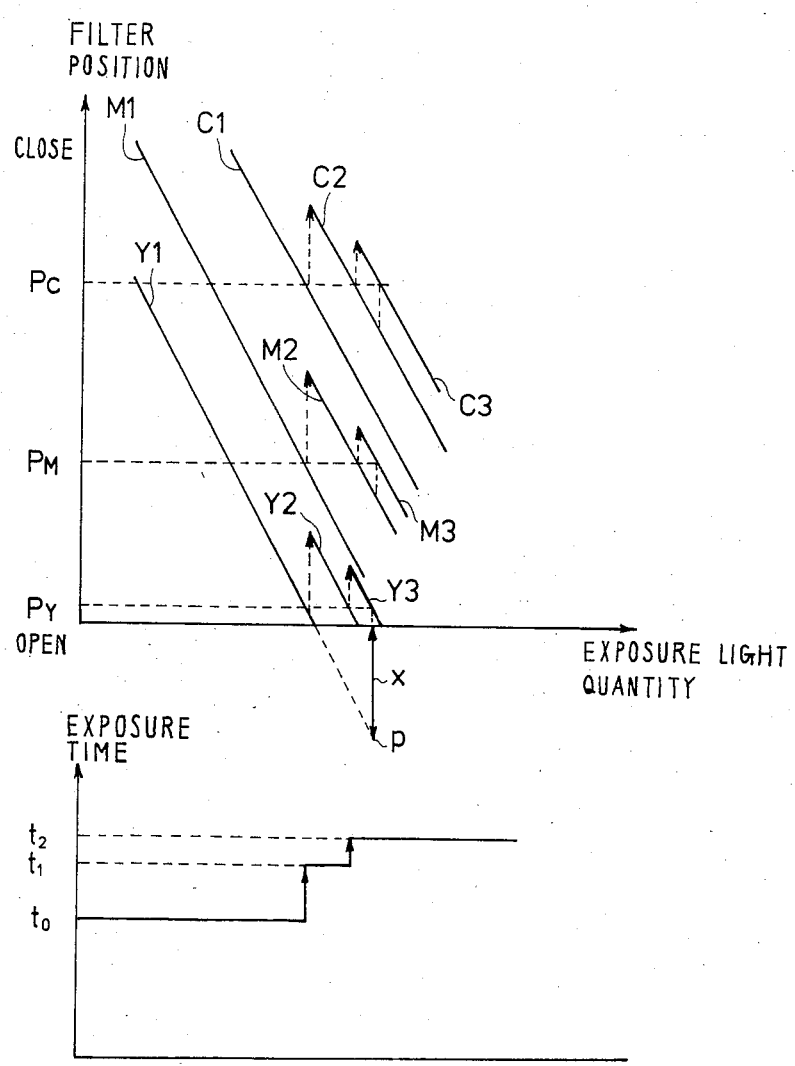
FIG. 23 is a graph explaining the exposure content changing operation.

As described above, the target position of the CC filter 40 is determined in the step 344. In this case, however, if the target position P of any of the component color filter pieces 42 exceeds its movable range, as shown in FIG. 23 (in the Figure, the range is exceeded by an amount x in the filter opening direction), the answer of the judgement made in the step 346 is negative, and a standard exposure time t0 (which has previously been fixed) is stepwise changed in the following manner. An exposure light quantity determined in correspondence with the changed exposure time, and a new target position is set on the basis of the determined exposure light quantity.

First of all, besides the standard exposure time t0, a plurality of exposure times for correction have previously been set on each of the overexposure and underexposure sides (in FIG. 23, the time t1 and the time t2 are only shown on the overexposure side).

In addition to the exposure light quantity-filter position characteristic curve which corresponds to the standard exposure time t0, a plurality of characteristic curves have previously been prepared in correspondence with those exposure times for correction (in FIG. 23 the only characteristic curves shown are those including C1, M1 and Y1 for the time t0, characteristic curves including C2, M2 and Y2 for the time t1, and characteristic curves including C3, M3 and Y3 for the time t2).

For example, if the target position exceeds the movable range by an amount x toward the overexposure side (in the step 346), the standard exposure time t0 is changed to the exposure time t2 (in the step 354).

Then, the expression of the relation between the exposure time and the exposure light quantity is read out (in the step 356), and an exposure light quantity is obtained from the expression of relation in correspondence with the exposure time t2. Then, the amount by which the exposure light quantity is to be changed and which corresponds to the change in the exposure time is calculated (in the step 358).

Further, correction movements which correspond to the change in the exposure light quantity are obtained by the use of the characteristic curves C3, M3 and Y3 and are added to the respective target positions so far obtained in the direction in which the component color filter pieces 42 are closed (in the step 360).

Then, the values obtained by the addition are set as new target positions (in the step 362).

Thus, in this color printer system, if the target position of any of the component color filter pieces 42 exceeds the movable range, the standard exposure time t0 (which has previously been fixed) is stepwise changed, and an exposure light quantity is determined in correspondence with the changed exposure time, and further, a new target position is set in correspondence with the determined exposure light quantity.

On the other hand, if it is judged in the step 352 that the exposure conditions are not satisfied by the photometric value measured in the step 350, the photometric value is not coincident with the target quantity of light due to possible mechanical errors involved in this color printer system, or instrumental errors of the system itself.

In such a case, the process proceeds to a step 364, where the following filter position change processing is started.

The filter position change processing will be described hereinunder by the use of the graph shown in FIG. 19.

As will be understood from FIG. 19, a photometric value D1 (in the step 350) is obtained at a position P0 (in the steps 344 and 362).

First, a photometric value D2 at the position P0 is estimated from the characteristic curve 500 (in the step 364).

Then, the difference between the values D1 and D2 is obtained and is added to the estimated value D2, whereby a value D3 representing the result of the addition is obtained (in a step 368).

Further, by the use of the value D3, a filter position P1 is obtained from the characteristic curve 500 and is set as a new filter target position (in a step 372) in place of the old position P0. It is to be noted that a target light quantity corresponding to this target position P1 is represented by a value D4 in FIG. 19.

Thus, according to this embodiment, the filter position change processing is executed on the assumption that new operating points (P1 and D4) are present on the characteristic curve 550 which includes the positions (P0 and D1) and which is obtained by moving the characteristic curve 500 in parallel by an amount which corresponds to the difference between the above-described values D1 and D2.

By virtue of this filter position change processing, this color printer system effects self-management in such a manner that the source light is automatically set at a target quantity and a target color independently of possible mechanical errors or instrumental errors.

As described above, this light adjustment is also effected by controlling the movement of the CC filter 40.

The following is a description of the exposure to be carried out subsequent to the above-described light adjustment.

In a first step 354 shown in FIG. 16, the shutter 60 is opened.

Then, the timer for controlling the exposure time is immediately started in a subsequent step 356, and monitoring is effected in a step 358 as to whether or not the timer has timed up.

If it is judged in the step 358 that the timer has timed up, the process proceeds to a step 360, where the shutter 60 is immediately closed.

In a subsequent step 362, the feed of the photographic paper 12 is started for the exposure of a subsequent frame, thus contriving speedup of the operation. In a step 364, monitoring is effected with respect to whether or not the feed of the photographic paper 12 has been completed.

If it is judged in the step 364 that the feed of the photographic paper 12 has been completed, the process proceeds to a step 366, where the component color filter pieces 42A, 42B and 42C which together constitute the CC filter 40, are moved to their respective target positions, thus being readied for the exposure of the next frame.

After the photographic paper 12 has thus been exposed, the exposed photographic paper 12 is supplied to the developing machine 14, where a development treatment is carried out. In the developing machine 14, the development conditions may be changed by, for example, the fatigue of the developer being used in the machine 14.

Any change in the development conditions is absorbed on this color printer system side by carrying out the following development management. By so doing, the results of the development effected by the development machine 14 are made uniform.

Two kinds of development mangagement processing are preapred for the purpose of absorbing changes in the development conditions, and either of them is selected according to need. The development management will be described hereinunder through these two kinds of processing in order.

When one of the kinds of development management is selected, the operation start instruction is supplied to the processor circuit 26 through the operation of the keyboard 72, whereby the routine shown in FIG. 17 is started.

In a first step 374 of this routine, a judgement is made as to whether or not the reference data, which will be described later, is available. If it is judged in the step 374 that the reference data is available, the data is set in a step 376.

Then, the turn-on control of the exposure lamp 16 is effected in a step 378, and the light emitted from the exposure lamp 16 is adjusted in a step 380 by controlling the drive of the CC filter 40, whereby the source light is adjusted and a target quantity and a target color are thus obtained.

Thereafter, a sample print is set on the film moving table 52 and is moved onto the exposure light path.

The sample print has previously been prepared in the following manner.

In a first step 382 shown in FIG. 18, the component color filter pieces 42A, 42B and 42C are driven so as to move to their respective target positions.

At this time, no negative film is set on the exposure light path and, therefore, the film moving table 52 is empty of negative film. Alternatively, a developed blank negative film or an ND filter (by which the level of the transmitted light is kept constant independently of variations in the input wavelength) is set on the film moving table 52 and is moved onto the exposure light path.

When the film moving table 52 is made empty, the position of the CC filter 40 is set at a position where the exposure light has a predetermined light quantity and becomes gray; when a developed blank negative film or an ND filter is employed, the position of the CC filter 40 is set at its totally-open position.

Thus, the component color filter pieces 42A, 42B and 42C, constituting the CC filter 40, are driven so as to move to their respective predetermined positions. Thereupon, the adjusted source light or the transmitted light is measured in a step 384 shown in FIG. 18 by the light-receiving units 68A, 68B, 68C, 68D, 68E and 68F. It is to be noted that this photometry is carried out according to the procedure shown in FIG. 13.

A judgement is made in a subsequent step 386 as to whether or not the measured value obtained in the step 384 is coincident with a target value. If it is judged in this step that both are not coincident with each other, the process proceeds to a step 388.

In the step 388, the deviation of the photometric value from the target value is calculated, and on the basis of the deviation figure, a correction amount in relation to the target position of the CC filter 40 is calculated in a subsequent step 390. The process then returns to the step 382.

When it is confirmed in the step 386 that the light which is to be applied to the photographic paper 12 has been adjusted to a target quantity and a target quality, exposure which is similar to the above-described operation is effected in a step 392, and this routine is ended.

Thereafter, the photographic paper 12 having been subjected to the above-described exposure is supplied to the developing machine 14, where a development treatment is carried out, and the above-described sample print is thereby obtained.

It is to be noted that, before being set on the film moving table 52, the sample print is cut into a size which matches the size of the film driving table 52.

When the thus obtained sample print is set on the exposure light path, the photometric operation shown in FIG. 13 is carried out in a step 394 shown in FIG. 17, whereby the transmission density of the sample print is measured by the light-receiving units 68A, 68B, 68C, 68D, 68E and 68F.

Then, a comparison is made in a subsequent step 396 between the transmission density of the sample print measured in the step 394 and the reference data set in the step 376.

This reference data represents the transmission density of a print which has been finished with a standard development and has previously been prepared as fixed data, or is the result of measurement which has previously been instructed.

Further, a judgement is made in a step 398 as to whether or not it is possible to correct the exposure conditions by the use of the result of the comparison made in the step 396, that is, the difference between the two transmission densities.

If it is judged in the step 398 that it is possible to make such correction, the process proceeds to a step 400, where the exposure conditions are corrected in accordance with the above-described difference.

On the other hand, if it is judged in the step 398 that it is not possible to correct the exposure conditions, the process proceeds to a step 402, where an alarm is displayed on the display 74.

It is to be noted that, according to this embodiment, the exposure conditions are corrected by adjusting the exposure time, whereby the change in development conditions of the developing machine 14 is absorbed in this color printer system.

The other development management will now be explained.

In this case, a photographic paper 12 which has already been subjected to standard exposure is prepared beforehand. The photographic paper 12 is developed by the developing machine 14 prior to the development management. It is to be noted that the photographic paper 12 has been previously supplied from, for example, a print manufacturer.

The photographic paper 12 is set on the film moving table 52 and is moved onto the exposure light path. Thereafter, the processing in the steps shown in FIG. 17 infra the step 394 is executed. It is to be noted that, if data used as a reference has not been prepared, a print which has been subjected to standard development is set on the film moving table 52 and is moved onto the exposure light path. Thereafter, the step 408 is carried out, whereby reference data is measured.

By means of either the first or the second development management, any change in development conditions of the developing machine 14 is absorbed in this color printer system in the form of a change in the exposure time.

It is to be noted that, in the first development management, exposure is effected and, therefore, not only a change in the development conditions but also a change in the exposure conditions is conveniently absorbed, so that final products are favorably uniform in their finished state of development.

On the other hand, according to the second development management, it is only possible to extract a change in the development conditions on the developing machine 14 side. It is, therefore, possible to confirm that the alarm generated in the step 402 only represents a change in the development conditions.

As has been described above, according to this embodiment, the sampling of light-reception signals is effected in synchronism with the lamp turn-on current which changes at a predetermined period. It is, therefore, possible to obtain stable photometric values at all times irrespective of the periodical change in the lamp turn-on current.

As a result, it becomes possible to obtain constant exposure results at all times even from the same negative film.

Further, the exposure power source is provided with the main circuit which converts an alternating current into the lamp turn-on current by means of the switching signal generator circuit, and the exposure lamp is turned on by the main circuit without employing any transformer. It is, therefore, possible to arrange the exposure power source at a reduced cost.

Moreover, since it is possible to constitute the phase detector by a simple comparator or a zero-crossing detector, there is no possibility of any increase in the costs required to produce the system.

In addition, according to this embodiment, the light-reception signal which is detected by the light receiver having its visual field limited to the exposure lamp is employed as a feedback signal for the turn-on control of the exposure lamp. It is, therefore, possible to control the source light at a constant target quantity at all times.

Further, since the light receiver has its visual field limited to the exposure lamp, there is no possibility that the light which is reflected from the CC filter and is changed in quantity by the movement thereof (the quantity of the reflected light is several percent of that of the source light) might enter the light receiver. Accordingly, even when the CC filter is moved, it is possible to accurately control the quantity of source light.

Furthermore, since it is possible to move the light receiver away from the exposure lamp, it is possible to employ a semiconductor light receiver which has high sensitivity and is capable of accurate detection. It is, therefore, possible to further increase the degree of accuracy in the above-described light quantity control.

Figure 24:
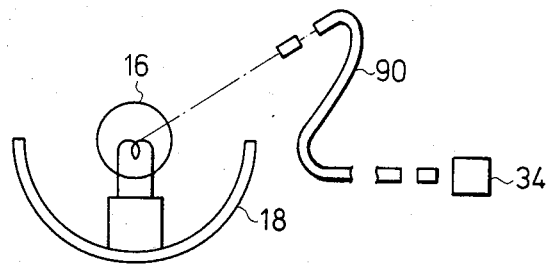
FIGS. 24, 25 and 26 respectively show arrangements of an optical system for limiting the visual field of the light receiver.
Figure 25:
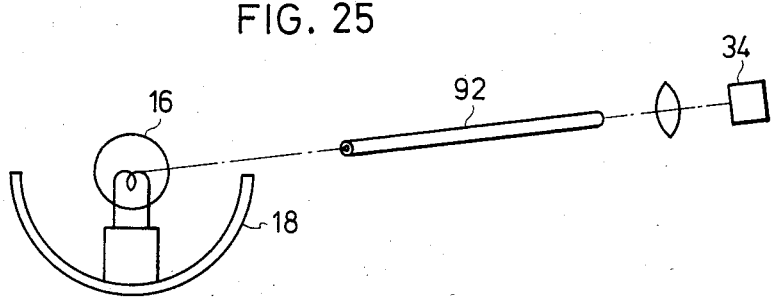
Figure 26:
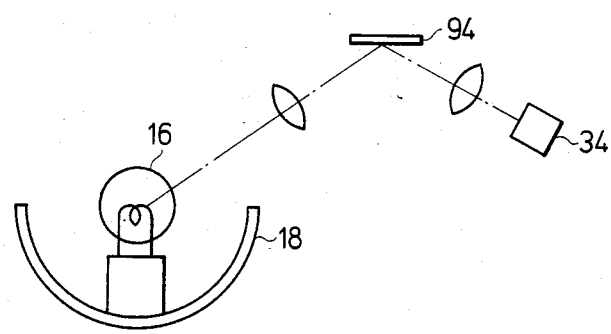

It is to be noted that the optical system 38 shown in FIG. 1 may be arranged by employing a glass fiber 90 in the manner shown in FIG. 24, or a tubular member 92 having its inner peripheral surface colored in black in the manner shown in FIG. 25, or a mirror 94 in the manner shown in FIG. 26. Further, it is preferable to dispose optical attenuator means, such as a filter or a slit, in front of the light-receiving surface of the light receiver for the purpose of ensuring the required light-reception linearity.

Additionally, according to this embodiment, a plurality of light-receiving units are directed toward the center of the negative film and are disposed symmetrically in relation to each other with respect to the perpendicular which passes through the center of the negative film. For this reason, even when the negative film has directional qualities in color (a difference which is produced between quantities of color light received when the negative film is rotated), it is possible to obtain the same exposure result.

Moreover, since the component color light receivers which are provided in each of the color light-receiving units are also disposed symmetrically in relation to each other, it is possible to obtain exposure results which are even more reliably constant.

It is to be noted that, when the arrangement is such that an optical system which is common to all the component light receivers alone is provided in front of the light-receiving surface of each of the color light-receiving units such that an image is partially formed on the light-receiving surface of each of the component color light receivers, it is preferable to provide an optical mixer on the side of each of the condenser lenses which is closer to the associated color light-receiving unit, thereby allowing uniform light to enter each of the component color light receivers.

Further, according to this embodiment, light source management, photometry and light adjustement are carried out simply by controlling the movement of the CC filter, and no cut filter nor scanner photometric device is employed. It is, therefore, possible to arrange the system at a reduced cost.

In light source mangement, it is possible to obtain at all times source light which has a reference quantity and a reference color by effecting control according to the reference characteristic curve.

Moreover, since the above-described reference characteristic curve is automatically generated, it is not necessary to prepare any reference characteristic curve, and it is possible to obtain an optimum reference characteristic curve in accordance with the system condition prevailing at that time.

It is to be noted that, since an optimum reference characteristic curve is learnt (in the step 288), it becomes possible, to obtain excellent source light at all times.

When it is necessary to provide an extremely excellent exposure result, it is preferable to generate a reference characteristic curve by the use of the above-described reference negative film. On the other hand, if a reference characteristic curve is generated without employing the reference negative film (in the step 264), it is not necessary to prepare a reference negative film for each individual kind of negative film, and it becomes possible to apply the reference characteristic curve to all kinds of negative film.

Further, photometry is carried out by effecting control such that the CC filter is moved to a predetermined position. Accordingly, it is possible to obtain stable photometric values.

If a plurality of photometric positions are set for the CC filter, then it becomes possible to obtain even more stable photometric results.

It is to be noted that, since the photometry is carried out in synchronism with the variation in the light source, it is possible to obtain accurate photometric values. The same is the case with light source control and light source management. Thus, it is possible to obtain a constant source light at all times.

In light adjustment, it is possible to obtain source light for exposure of any desired color, and it is possible to improve the picture quality. Further, it is possible to increase the speed of the operation.

Further, according to this embodiment, if the CC filter exceeds its light adjustable range when light adjustment is being effected, the exposure time is stepwisely changed, and light adjustment is effected on the basis of the above-described characteristic curves C, M and Y in relation to the exposure time. It is, therefore, possible to incorporate the reciprocity law failure in the characteristic curves C, M and Y, so that it is possible to obtain a desired exposure result. Moreover, since the value is constant for each of the exposure periods of time, calculation is facilitated, and it becomes possible to increase the calculation speed.

Also, according to this embodiment, if the development conditions are changed on the developing machine side by, for example, the fatigue of the developer, the change in the development conditions is absorbed in the color printer system. There is, therefore, no need for any experience in the management and handling of the developing machine for coping with the change in the development conditions. Thus, easy handling of the developing machine is facilitated.

It is to be noted that, when it is no longer possible to absorb the change in the development conditions on the color printer system side, it is preferable for an alarm to be given, as in the case of this embodiment.

Additionally, according to this embodiment, setup conditions, such as the standard exposure time, the RGB balance and the slope characteristic curve, have previously been given as fixed data. For this reason, it is possible to start the system immediately after it has been installed by a user. In addition, this setup is easily conducted without the need for any experience.

Furthermore, the slope processing is effected by the use of the slope characteristic curve 502 in the manner shown in FIG. 21. It is, therefore, possible to obtain a further accurate exposure amount by making this characteristic curve 502 coincident with the photosentive characteristics shown in FIG. 20.

Moreover, this color printer system is designed as a full-correction system in which light source management and other operations are automatically conducted and any change in its characteristics and performance with time is prevented. Thus, it is possible to obtain a running condition which is similar to that in its initial stage at all times.

As has been described above, according to the present invention, light source management, photometry and light adjustment are conducted simply by controlling the movement of the CC filter, and no cut filter nor scanner photometric device is employed. It is, therefore, possible to arrange the color printer system at a reduced cost.

What is claimed is:

1. A color printer system, comprising:
    (a) a filter driver for moving a CC filter toward and away from an exposure light path;
    (b) a negative film transmission light measuring device entered by source light emitted from an exposure lamp and passed through said CC filter; and
    (c) control means for controlling the movement of said CC filter by controlling the drive of said filter driver such that said CC filter is moved to the following three positions: a light source target position where the source light detected by said negative film transmission light measuring device takes a predetermined quantity and a predetermined color; a photometry target position which is obtained on the basis of said light source target position; and a light adjustment target position which is obtained on the basis of said photometry target position,
    whereby light source management, photometry and light adjustment are automatically carried out.

2. A color printer system according to claim 1, wherein said CC filter includes three component color filters of cyan, magenta and yellow.

3. A color printer system according to claim 2, wherein said filter driver is constituted by a step motor connected to each of said component color filters, whereby each filter is independently moved in a direction orthogonal to the exposure light path.

4. A color printer system according to claim 3, further comprising film moving means disposed between said negative film transmission light measuring device and said CC filter and capable of alternately moving a reference negative film and a negative film onto the exposure light path.

5. A color printer system according to claim 4, wherein said negative film transmission light measuring device includes three pairs of light-receiving units arranged in symmetry in relation to each other with respect to the exposure light path.

6. A color printer system according to claim 5, wherein said negative film transmission light measuring device is constituted by a pair of light-receiving units including a component color light receiver which detects only blue and a component color light receiver which detects only green, a pair of light-receiving units including a component color light receiver which detects only blue and a component color light receiver which detects only red, and a pair of light-receiving units including a component color light receiver which detects only blue and a component color light receiver which detects only green.

7. A color printer system according to claim 6, wherein the component color light receivers respectively included in the light-receiving units which are paired are disposed in symmetry in relation to each other with respect to the exposure light path.

8. A color printer system according to claim 5, wherein each of said light-receiving units includes a component color light receiver which detects only red, a component color light receiver which detects only green and a component color light receiver which detects only blue.

9. A color printer system which automatically prints a negative film on a photographic paper by light exposure, comprising:
    (a) an exposure lamp for exposing said photographic paper;
    (b) a CC filter disposed such as to be able to come toward and away from the exposure light path of said exposure lamp;
    (c) a filter driver for driving said CC filter;
    (d) a negative film transmission light measuring device entered by source light emitted from said exposure lamp and passed through said CC filter; and
    (e) control means for controlling the quantity of light emitted from said exposure lamp and further controlling the movement of said CC filter by controlling the drive of said filter driver such that said CC filter is moved to the following three positions: a light source target position where the source light detected by said negative film transmission light measuring device takes a predetermined quantity and a predetermined color; a photometry target position which is obtained on the basis of said light source target position; and a light adjustment target position which is obtained on the basis of said photometry target position, whereby light source management, photometry and light adjustment are automatically carried out.

10. A color printer system according to claim 9, further comprising source light receiving means for detecting the quantity of light emitted from said exposure lamp, whereby the quantity of light emitted from said exposure lamp is controlled by said control means on the basis of the detected light quantity value.

11. A color printer system according to claim 10, wherein said CC filter includes three component color filters of cyan, magenta and yellow.

12. A color printer system according to claim 11, wherein said filter driver is constituted by a step motor connected to each of said component color filters, whereby each filter is independently moved in a direction orthogonal to the exposure light path.

13. A color printer system according to claim 12, further comprising film moving means disposed between said negative film transmission light measuring device and said CC filter and capable of alternately moving a reference negative film and a negative film onto the exposure light path.

14. A color printer system according to claim 13, wherein said negative film transmission light measuring device includes three pairs of light-receiving units arranged in symmetry in relation to each other with respect to the exposure light path.

15. A color printer system according to claim 14, wherein said negative film transmission light measuring device is constituted by a pair of light-receiving units including a component color light receiver which detects only blue and a component color light receiver which detects only green, a pair of light-receiving units including a component color light receiver which detects only blue and a component color light receiver which detects only red, and a pair of light-receiving units including a component color light receiver which detects only blue and a component color light receiver which detects only green.

16. A color printer system according to claim 15, wherein the component color light receivers respectively included in the light-receiving units which are paired are disposed in symmetry in relation to each other with respect to the exposure light path.

17. A color printer system according to claim 13, wherein each of said light-receiving units includes a component color light receiver which detects only red, a component color light receiver which detects only green and a component color light receiver which detects only blue.

18. A color printer system according to claim 16, wherein said exposure lamp is supported inside a lamp reflector having a curved surface, said reflector being formed with a detection window for limiting the visual field of said source light receiving means, whereby only the light passing through said detection window is detected by said source light receiving means.

19. A color printer system according to claim 18, further comprising an optical system disposed between said detection window and said source light receiving means such as to form the image of the filament of said exposure lamp on the light-receiving surface of said source light receiving means.

20. A color printer system according to claim 19, wherein said optical system is constituted by a glass fiber.

* * * * *